United States Patent
Hatley et al.

(10) Patent No.: US 7,872,988 B1
(45) Date of Patent: *Jan. 18, 2011

(54) METHODS AND APPARATUSES FOR GENERATING NETWORK TEST PACKETS AND PARTS OF NETWORK TEST PACKETS

(75) Inventors: William T. Hatley, San Jose, CA (US); Thomas R. McBeath, Calabasas, CA (US)

(73) Assignee: Spirent Communications, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/563,453

(22) Filed: Sep. 21, 2009

(51) Int. Cl.
*H04L 12/26* (2006.01)
(52) U.S. Cl. .................................... 370/252
(58) Field of Classification Search ............. None
See application file for complete search history.

(56) References Cited

U.S. PATENT DOCUMENTS

| | | | |
|---|---|---|---|
| 6,252,891 B1 | 6/2001 | Perches | |
| 6,457,152 B1 * | 9/2002 | Paley et al. | 714/738 |
| 6,721,276 B1 * | 4/2004 | Kher et al. | 370/242 |
| 7,194,535 B2 | 3/2007 | Hannel et al. | |
| 7,489,706 B2 | 2/2009 | Hatley et al. | |
| 7,594,159 B2 | 9/2009 | Fujikami et al. | |
| 2007/0121516 A1 * | 5/2007 | Hannel et al. | 370/241 |
| 2008/0239972 A1 * | 10/2008 | Omar | 370/250 |

OTHER PUBLICATIONS

Netcom System "UltraViolet/Goldmine OC192-10GEthernet System Design" Version 3.0 The UltraGold Design Team, Sep. 17, 2001, consisting of 330 pages.
Steven Pope et al. "End of the Road for TCP Offload" White Paper: SF-100913-TC, Solarflare Communications, Inc., dated Apr. 2, 2007, pp. 1-5.
Netxen, Inc., "10Gig Chimney—Smoking the Competition" White Paper, 2006, pp. 1-3.

* cited by examiner

*Primary Examiner*—Anh-Vu Ly
(74) *Attorney, Agent, or Firm*—Kenta Suzue; Haynes Beffel & Wolfeld LLP

(57) ABSTRACT

Some aspects of the technology relate to the generation for test purposes of test packet ingredients by a microprocessor, ongoing with the generation for test purposes of test packets incorporating the test packet ingredients by a high-speed FPGA. Some aspects of the technology relate to the generation of outgoing test packets incorporating the test packet ingredients, at a programmable logic device such as an FPGA. These aspects are implemented as an apparatus, a method, computer readable medium, and a data structure.

23 Claims, 20 Drawing Sheets

| 3 3 | 2 2 2 2 2 2 2 2 2 | 1 1 1 1 1 1 1 1 1 1 | | | | | | | | | | | |
|---|---|---|---|---|---|---|---|---|---|---|---|---|
| 1 0 | 9 8 7 6 5 4 3 2 1 | 0 9 8 7 6 5 4 3 2 1 | 0 9 8 7 6 5 4 3 2 1 0 | | | | | | | | | |

| Fill Type | Fill Byte | Fragment Dwords | NMod | Base Content Length |
|---|---|---|---|---|
| Ethernet Length Delta | | Ethernet Length Offset | Stream Index | |
| ipe | ip4 | tcp | udp | | Signature Offset | TCP/UDP Header Offset | IP Header Offset |
| eck | in4 | vln | mpl | fcs | vfd8 Msk | vfd7 Msk | vfd6 Msk | vfd5 Msk | vfd4 Msk | vfd3 Msk | vfd2 Msk | vfd1 Msk |
| | psh | ifc | ife | | Inner FCS End | Inner FCS Offset | Inner IP Header Offset |
| | Offset 2 | Offset 1 | Offset 0 |
| | Offset 5 | Offset 4 | Offset 3 |
| | ... | | |
| | Offset N-1 | Offset N-2 | Offset N-3 |

FIG. 9

| Stutter Count 4 | Stutter Count 3 | Stutter Count 2 | Stutter Count 1 |
|---|---|---|---|
| VFD Count 4 | VFD Count 3 | VFD Count 2 | VFD Count 1 |
| Sequence Number | | RIT Count | RIT Stutter Ct |
| Max Stutter 4 | Max Stutter 3 | Max Stutter 2 | Max Stutter 1 |

(Stutter Count 1, VFD Count 1, RIT Stutter Ct, Max Stutter 1 — These fields are volatile. (single cache line). All others are read-only)

| VFD Incr 4 | VFD Incr 3 | VFD Incr 2 | VFD Incr 1 |
|---|---|---|---|
| VFD Recycle 4 | VFD Recycle 3 | VFD Recycle 2 | VFD Recycle 1 |
| VFD Init 4 | VFD Init 3 | VFD Init 2 | VFD Init 1 |
| | | RIT Recycle | RIT Max Stutr Ct |

FIG. 11

| Stutter Count 4 | Stutter Count 3 | Stutter Count 2 | Stutter Count 1 |
|---|---|---|---|
| Stutter Count 8 | Stutter Count 7 | Stutter Count 6 | Stutter Count 5 |
| VFD Count 4 | VFD Count 3 | VFD Count 2 | VFD Count 1 |
| VFD Count 8 | VFD Count 7 | VFD Count 6 | VFD Count 5 |

These fields are volatile (single cache line). All others are read-only

| Max Stutter 4 | Max Stutter 3 | Max Stutter 2 | Max Stutter 1 |
|---|---|---|---|
| Max Stutter 8 | Max Stutter 7 | Max Stutter 6 | Max Stutter 5 |
| VFD Init 4 | VFD Init 3 | VFD Init 2 | VFD Init 1 |
| VFD Init 8 | VFD Init 7 | VFD Init 6 | VFD Init 5 |

| VFD Recycle 4 | VFD Recycle 3 | VFD Recycle 2 | VFD Recycle 1 |
|---|---|---|---|
| VFD Recycle 8 | VFD Recycle 7 | VFD Recycle 6 | VFD Recycle 5 |
| VFD Incr 4 | VFD Incr 3 | VFD Incr 2 | VFD Incr 1 |
| VFD Incr 8 | VFD Incr 7 | VFD Incr 6 | VFD Incr 5 |

FIG. 12

| Sequence Number | | RIT Count | RIT Sutter Ct |
|---|---|---|---|
| | | RIT Recycle | RIT Max Stutr Ct |

FIG. 13

METHODS AND APPARATUSES FOR GENERATING NETWORK TEST PACKETS AND PARTS OF NETWORK TEST PACKETS

BACKGROUND

1. Field of the Invention

The technology relates to network test equipment simulating a network. Separately, the technology relates to the generation of network test packets and/or the generation of parts of network test packets.

2. Description of Related Art

The technology disclosed includes a hardware architecture for methods and apparatuses used to test routers, switches and the like, particularly high volume infrastructure devices.

Network test equipment tests component network equipment such as routers and edge devices, by simulating network traffic from and/or to an emulated network, thereby sparing the trouble of actually setting up a real network having the complexity of the emulated network. To assemble and send traffic and to receive and characterize received traffic, present network test equipment relies significantly on a large amount of fast memory, such as SRAM, connected to an FPGA.

This network test equipment architecture of i) a microprocessor and ii) an FPGA connected to a large amount of fast memory (SRAM), arose from the slow links (e.g., PCI) connecting the microprocessor and the FPGA. Such links have been historically simply too slow to keep up with the demands of the FPGA to send and/or receive traffic. Because the FPGA frequently interacts with the memory structures required to send and/or receive traffic, if the fast memory were connected to the microprocessor rather than the FPGA, then the links between the microprocessor and the FPGA would be overwhelmed.

Accordingly, this fast memory is connected to the FPGA, to minimize latency of communicating packet ingredients and other data with the FPGA. This is in contrast with slow memory, such as DRAM, acting as the main memory for a microprocessor.

Unfortunately, fast memory is expensive, and the desired quantity of fast memory continues to steadily increase. This expected increase in the amount of fast memory connected to the FPGA is driven by the increasing capability of network equipment, which in turn increases the requirements of network test equipment. The expected design trend is to continue to increase the quantity of fast SRAM connected to the FPGA.

The slow links connecting the microprocessor and the FPGA contribute to the quantity of required SRAM. Such links are too slow to keep up with the demands of the FPGA to send and/or receive traffic on a "live" basis. In particular, the CPU cannot generate data required by the FPGA, such as ingredients for outgoing test packets, on an ongoing basis as the FPGA generates outgoing test packets. Instead, prior to any significant amount of test packet generation by the FPGA, the CPU must generate all of the required ingredients for outgoing test packets, and again prior to any significant amount of test packet generation by the FPGA, all of these ingredients must be transferred over the slow links to SRAM connected to the FPGA. In more recent architectures, this has required some 24 megabytes of expensive fast SRAM connected to the FPGA, largely to store all of these ingredients to be quickly accessible by the FPGA during the test packet generation by the FPGA.

Due to the requirements that, prior to any test packet generation by the FPGA, the CPU must i) generate the complete tables, and ii) transfer the complete table contents over to the SRAM connected to the FPGA, the tables in the SRAM connected to the FPGA must be "over inclusive". These tables include not only entries that are used by the FPGA eventually to make test packets, but also entries that will not used by the FPGA eventually to make test packets. Prior to any test packet generation by the FPGA, when the tables are transferred from the CPU to the SRAM connected to the FPGA, the FPGA is not making any test packets, and the FPGA is not requesting particular data required to assemble packets. When the SRAM connected to the FPGA is being filled by the tables generated by the CPU, the FPGA simply takes the data from the CPU and puts the data into the correct SRAM connected to the FPGA.

In a prior release of Spirent TestCenter™, the following tables of data are generated by the CPU and transferred to the SRAM connected to the FPGA, prior to generating any test packets: i) a frame sequence table, ii) frame control structures table, iii) base content table, and iv) modifier parameters table. To make a frame, the FPGA first reads the next entry of the frame sequence table. The frame sequence table has a sequence of 8 byte entries which each define a frame, by pointing to particular entries of the frame control structures table, the base content table, and modifier parameters table. Then, the FPGA accesses the entries of the frame control structures table and the base content table, as identified by the entry of the frame sequence table, and makes a frame template. Finally, the FPGA accesses the entry of the modifier parameters table, as identified by the entry of the frame sequence table. At this time, the FPGA not only retrieves the locations in the frame that must be modified, but also the raw input data required by the FPGA to calculate the modifier values inserted by the FPGA. Accordingly, the modifier parameters table is relatively complicated, and includes a starting value, ending value, stutter counter, 6-8 parameters, increment/decrement/random indicators, and offset values to identify the location(s) of the frame to insert the eventual modifier values calculated by the FPGA using the entry of the modifier parameters table.

The resulting cost penalty on the bill of materials including the fast SRAM to store all these tables is substantial, such that the cost of fast SRAM alone is roughly half the cost of parts for manufacturing such test equipment. Nevertheless, the increased bill of materials is viewed as a requirement, because of the requirements to support a wide variety of test traffic requiring a wide variety of test packet ingredients, and because of the previously discussed bottleneck on data transfers of these test packet ingredients between the FPGA and microprocessor.

SUMMARY

Various aspects of the technology disclosed relate to the generation for test purposes of test packet ingredients by a microprocessor, ongoing with the generation for test purposes of test packets incorporating the test packet ingredients by a high-speed FPGA.

Various other aspects of the technology relate to the generation of outgoing test packets incorporating the test packet ingredients, at a programmable logic device such as an FPGA. This allocation of responsibility for generating test packets relies more heavily on the microprocessor than previous approaches, such as in the generation of modifying data that customizes outgoing test packets. A benefit of this burden shifting from the FPGA to the microprocessor, is that the microprocessor is relatively easier to program than the FPGA. The configurable interconnects of an FPGA allow the FPGA to be updated, such as when network protocols are updated to maintain the network test equipment. However, this great flexibility of programming the FPGA is accompanied by difficulty of programming the FPGA and resulting cost. Thus, allocating more responsibility to the microprocessor simplifies programming to the extent that the programming burden is shifted away from the FPGA to the microprocessor.

Yet other aspects of the technology relate to combining the generation of test packet ingredients by a microprocessor, and the generation of outgoing test packets incorporating the test packet ingredients, at a programmable logic device. This technology of generating test packets at the programmable logic device incorporates test packet ingredients generated by the microprocessor. This technology takes advantage of a memory arrangement that relies on memory of the microprocessor, where the memory is coupled by a memory bus to the memory controller of the microprocessor, and the memory arrangement relies less on memory of the programmable logic device. This memory arrangement substantially reduces the bill of materials, by permitting a greater reliance on inexpensive memory of the microprocessor and less reliance on expensive memory of the FPGA.

BRIEF DESCRIPTION OF THE DRAWINGS

FIG. 9 is an example data structure format of a control fragment of a recipe of a packet, such as in FIGS. 5 and 6.

FIG. 11 is an example Modifier Parameters data structure format used by the CPU to process up to 4 VFD (Variable Fields) using processor instructions FIG. 12 is an example Modifier Parameters data structure format used by the CPU to process up from 5 to 8 VFD (Variable Fields) using processor instructions.

FIG. 13 is an example data structure format of a CPU instruction with a sequence number to access separate arrays.

DETAILED DESCRIPTION

Figure 1:
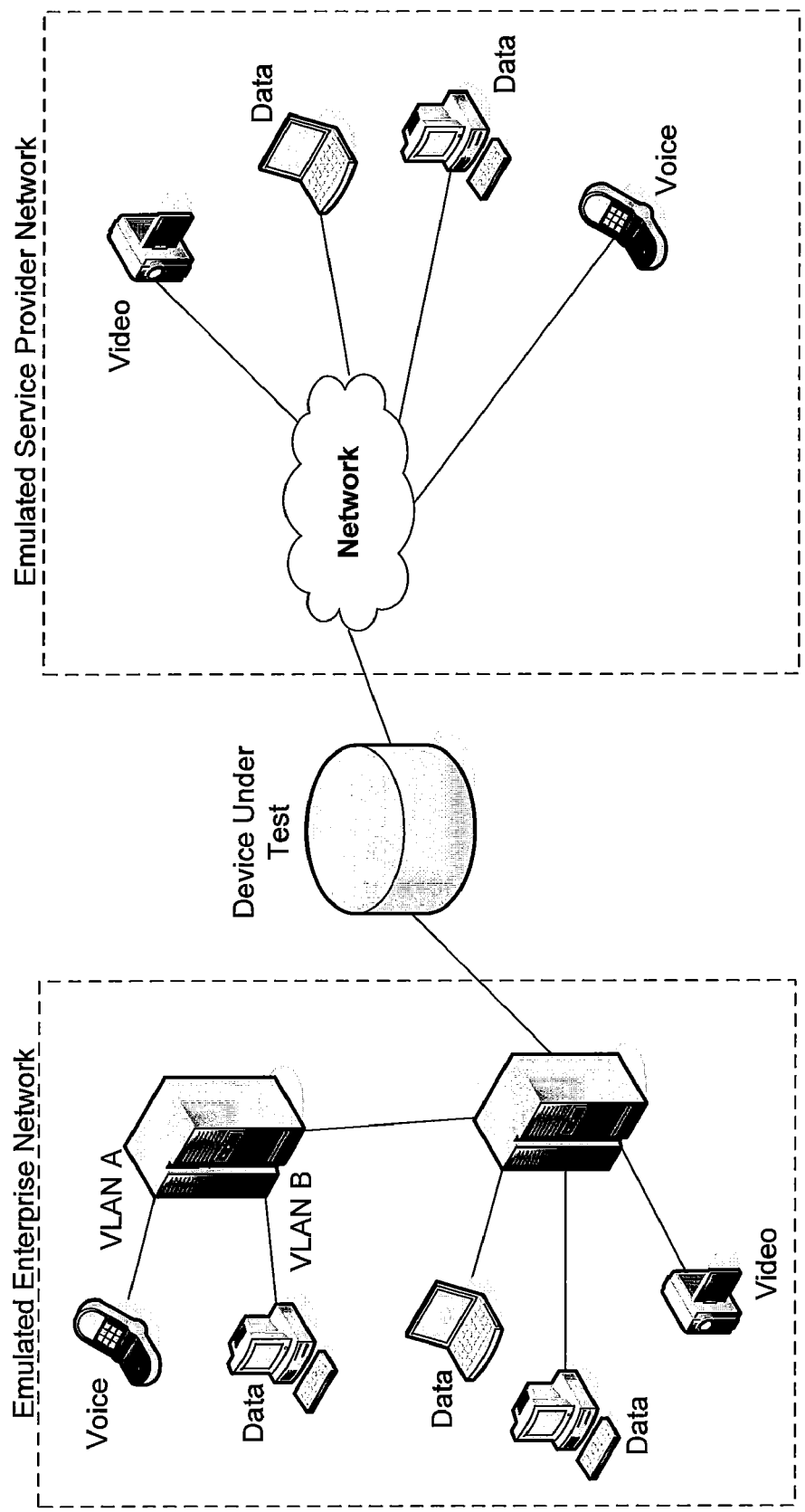
FIG. 1 is an example simplified network test topology with emulated enterprise and emulated service provider networks.

FIG. 1 is an example simplified network test topology with emulated enterprise and emulated service provider networks.

Depicted is a sample test topology for layer 2-3 switching and routing between enterprise networks and service provider networks. The device under test, such as an enterprise router or metro router, sits between the emulated networks. In this figure, the emulated enterprise network includes virtual LAN or "VLAN" segments. Traffic on the enterprise network includes voice, data and video. On the emulated service provider in our side of the DUT, sources of voice, data and video content are represented. The switching and routing devices in this scenario may support a large number of layer 2/3 technologies, including different virtual LAN encapsulations, various quality of service ("QOS") schemes, and dual-stack IPv6/IPv4 forwarding. Testing is particularly useful because each new feature or protocol increases the risk of functional or performance problems, many of which are hard to find without creating and analyzing a wide range of traffic scenarios.

In another test topology, the DUT itself includes an actual, nonemulated enterprise network or an actual, nonemulated service provider network.

Figure 2:
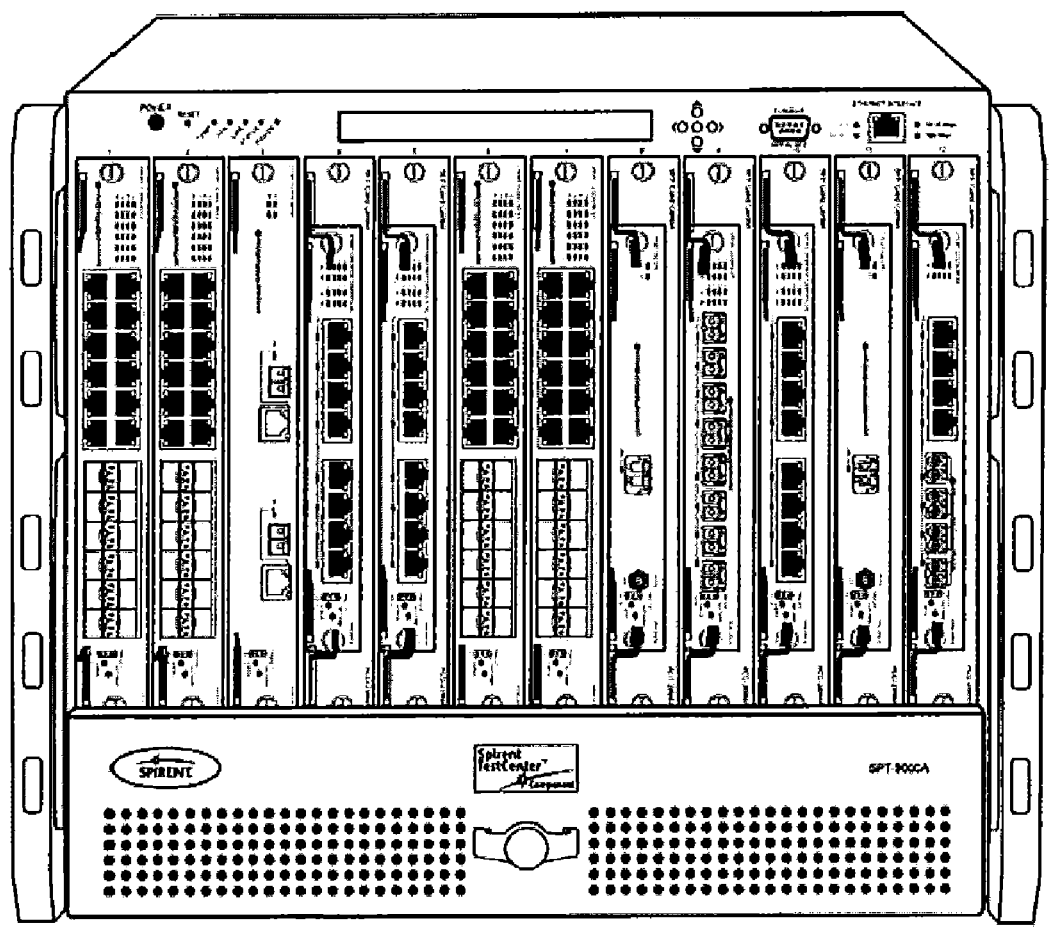
FIG. 2 is an example line drawing of a network test chassis to emulate networks, such as in FIG. 1.

FIG. 2 is an example line drawing of a network test chassis to emulate networks, such as in FIG. 1.

Shown is a line drawing of a Spirent™ SPT-9000A test chassis. The Spirent TestCenter SPT-9000A is one in a family of network test systems emulating network topologies, such as the emulated enterprise network and emulated service provider network shown in FIG. 1. Other members include the SPT-5000A, a high density network performance test system and the portable SPT-2000A/HS. Among this family, the SPT-9000A is the very high density test member typically used in the lab or a production test environment.

This test system is highly suitable, where high density Ethernet ports are desired for high-volume production and large port count testing. This test system has 12 vertical slots that can support a variety of module configurations. For instance, the chassis can be filled with up to 144 10/100/1000 Mb per second Ethernet ports. Or, it can be filled with 144 fiber or dual media gigabit Ethernet ports. It can support up to 24 10-gigabit Ethernet ports, 24 UniPHY (10 GbE/OC-192

POS) ports, 24 WAN OC-48/12/3 POS ports or 24 10 GBASE-T ports. It is anticipated that 40 GbE and 100 GbE ports also will be supported, as testing requirements rise. FIG. 1 depicts various modules supporting a mix of port types.

The Spirent TestCenter™ is one example of integrated performance analysis and service assurance systems that enable the development and deployment of next-generation networking technology, such as Internet telephony, broadband services, 3G wireless, global navigation satellite systems and network security equipment. The technology described in this disclosure applies to Spirent TestCenter™ products and generally to IP performance test systems and service verification platforms for IP-based infrastructure and services. This technology is useful in systems that test and validate performance and scalability characteristics of next-generation networking technology for voice, video and data services. Test devices, using the technology disclosed, are useful to network and telephony equipment manufacturers, semiconductor manufacturers, service providers, government departments, and enterprises to validate the capabilities and reliabilities of complex IP networks, devices and applications, such as networks for delivery of triple play packages that include voice, and video and data services. The technology disclosed is useful in testing both control plane and data plane traffic.

Figure 3:
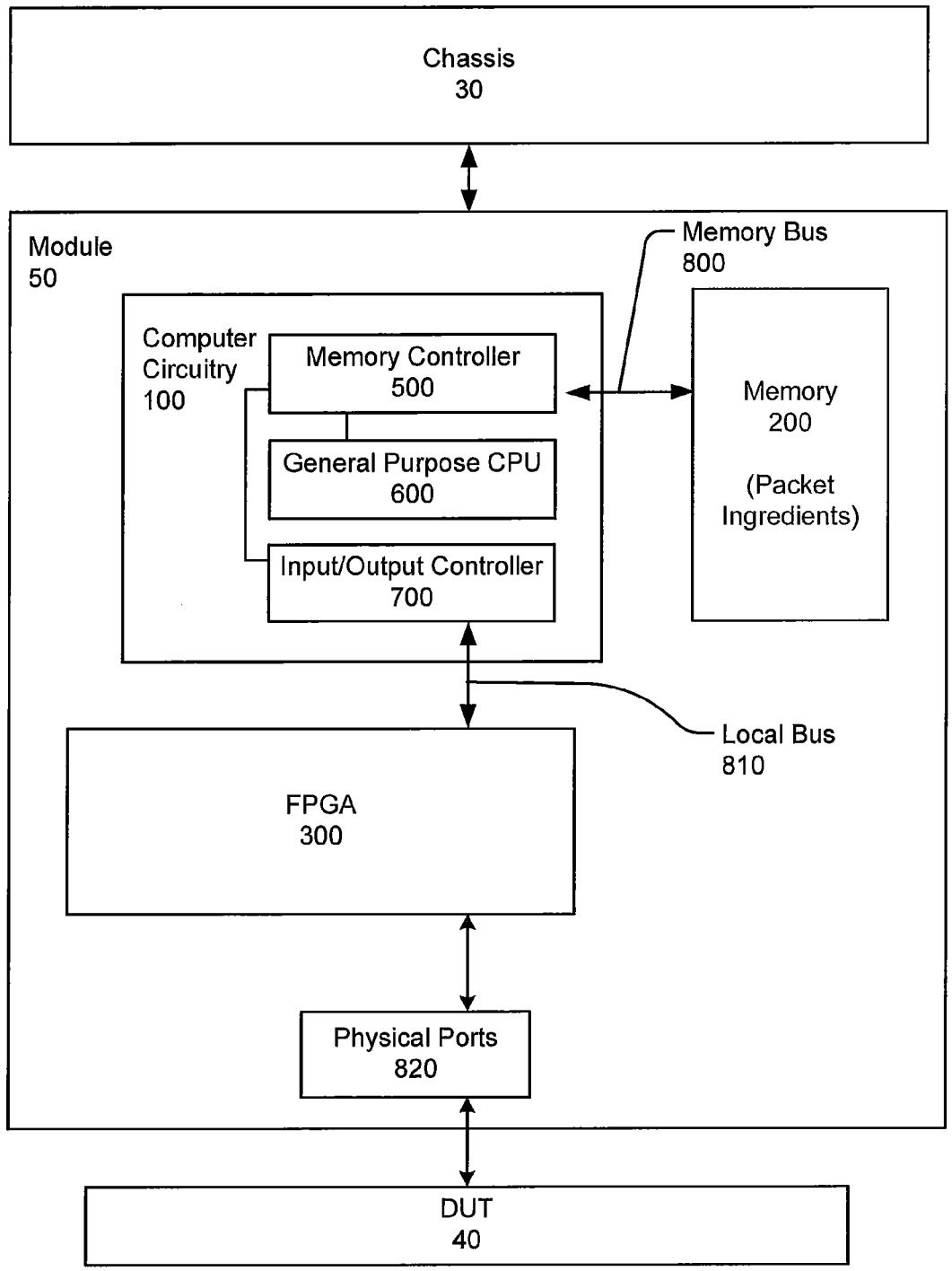
FIG. 3 is an example block diagram of a test module inserted into a chassis such as in FIG. 2.

FIG. 3 is an example block diagram of a test module inserted into a chassis such as in FIG. 2.

The test module 50 is inserted into the chassis 30, for example the Spirent™ SPT-9000A test chassis. The test module 50 emulates a network such as the enterprise network or service provide network as in FIG. 1, and communicates test packets of the emulated networks with the device under test 40. The computer circuitry 100 of the module 50 includes a general purpose microprocessor 600, a memory controller 500 of the microprocessor 600, and an input/output controller 700 of the microprocessor 600. Although the memory controller 500 is shown as an intermediate component between the microprocessor 500 and the input/output controller 700, this is merely an illustrative embodiment. The memory controller 500 is connected by a memory bus 800 to memory 200. The memory 200 stores test packet ingredients generated by the microprocessor 600. In one embodiment, about 192 megabytes of such memory is allocated per physical link, to store transmit and receive buffers, the generator and analyzer structures discussed below. Additional memory is required for the operating system and other applications. The FPGA 300 is connected by a local bus 810 to the input/output controller 700, and generates outgoing test packets incorporating the test packet ingredients from the memory 200. The FPGA 300 communicates incoming and outgoing test packets with the DUT 40 via the physical ports 820. Examples of physical ports 820 are consistent with the FIG. 2 discussion of 10/100/1000 Mb per second Ethernet ports, fiber or dual media gigabit Ethernet ports, 10-gigabit Ethernet ports, UniPHY (10 GbE/OC-192 POS) ports, WAN OC-48/12/3 POS ports, and 10 GBASE-T ports, and anticipated 40 GbE and 100 GbE ports.

Figure 4:
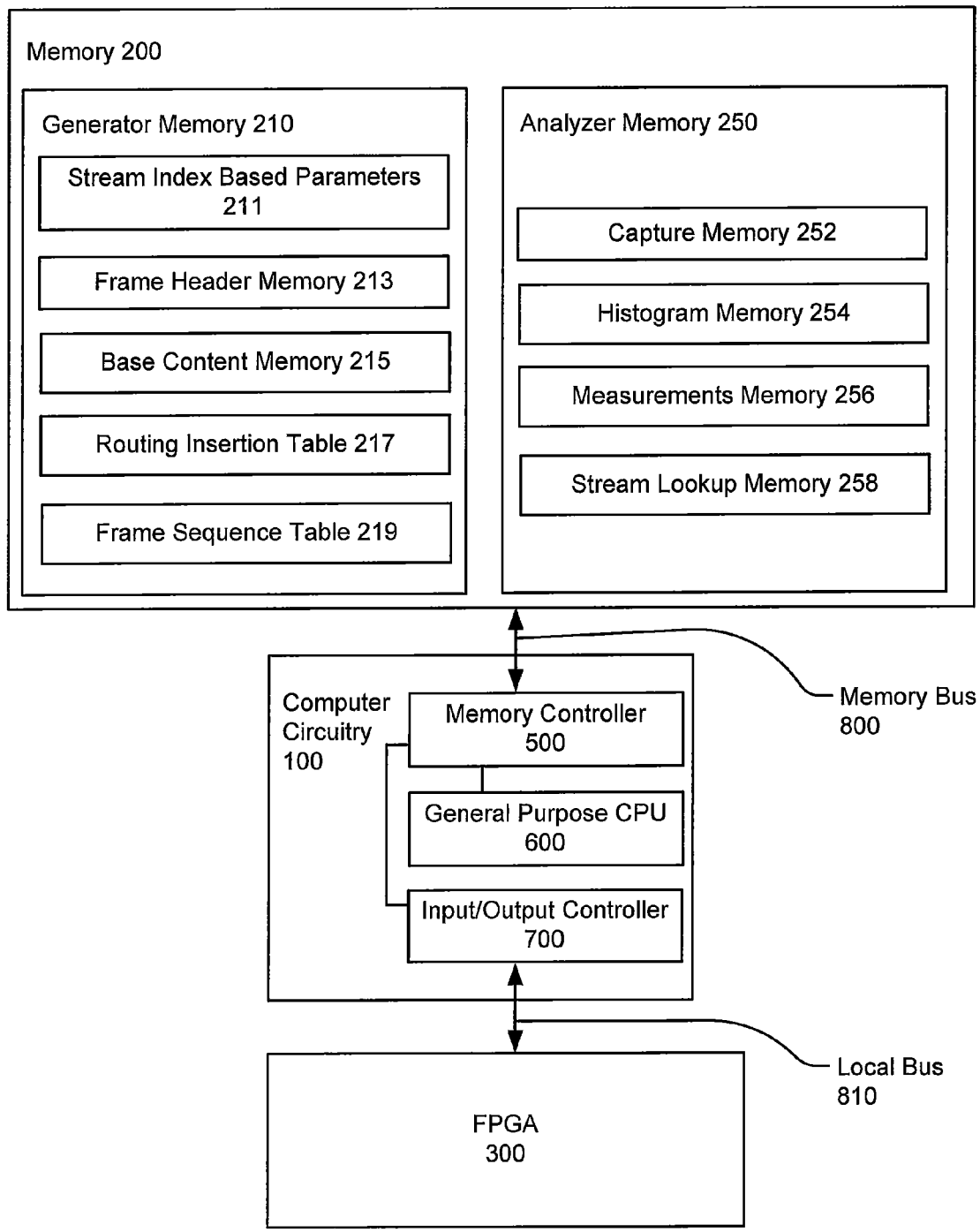
FIG. 4 is an example block diagram of part of a test module such as in FIG. 3, showing the generator and analyzer structures in the memory accessed by the memory bus.

FIG. 4 is an example block diagram of part of a test module such as in FIG. 3, showing the generator and analyzer structures in the memory accessed by the memory bus.

Parts of the memory 200 are occupied by the data structures of the generator memory 210 and the analyzer memory 250. The generator memory 210 includes data structures supporting the generation of outgoing test packets. The analyzer memory 250 includes data structures supporting the receipt and analysis of incoming test packets.

The generator memory 210 includes the following data structures: stream index based parameters 211, frame header memory 213, base content memory 215, routing insertion table 217, and frame sequence table 219. The analyzer memory 250 includes the following data structures: capture memory 252, histogram memory 254, measurements memory 256, and stream lookup memory 258.

Figure 5:
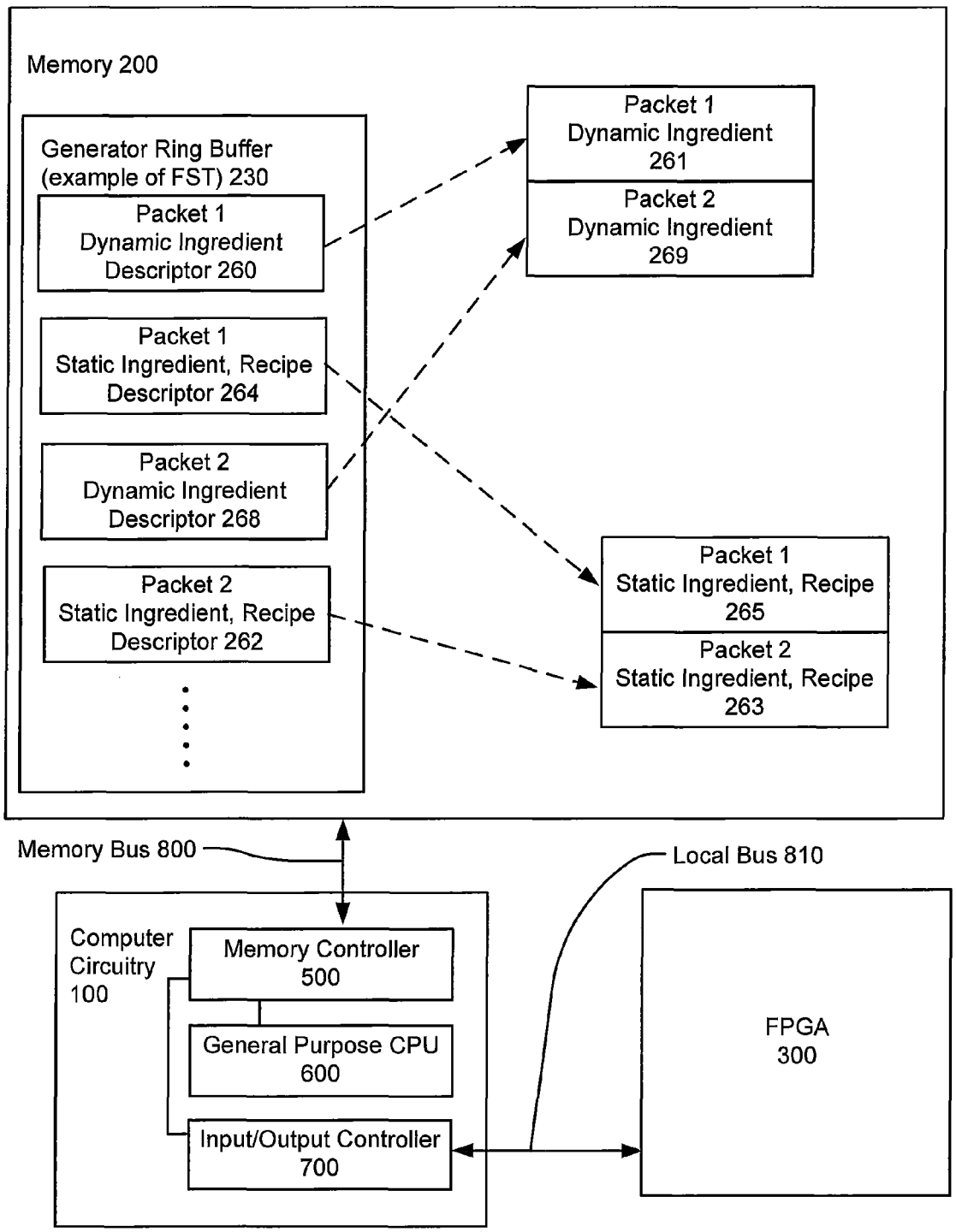
FIG. 5 is an example block diagram of part of a test module such as in FIG. 3, showing the generator ring buffer of the generator holding ingredient descriptors, which point to the dynamic and static ingredients in the memory accessed by the memory bus.

FIG. 5 is an example block diagram of part of a test module such as in FIG. 3, showing the generator ring buffer of the generator holding ingredient descriptors, which point to the dynamic and static ingredients in the memory accessed by the memory bus. The dynamic ingredient descriptors, static ingredient descriptors, dynamic test packet ingredients, and static test packet ingredients are generated b the microprocessor 600 and stored in the memory 200 by the memory controller 500 of the microprocessor 600.

The generator ring buffer 230 is an example of the frame sequence table 219. The generator ring buffer 230 includes dynamic ingredient descriptors and static ingredient and recipe descriptors to locate in memory the test packet ingredients and recipes of the outgoing test packets. For example, for an outgoing test packet 1, the generator ring buffer 230 includes a dynamic ingredient descriptor 260 and a static ingredient and recipe descriptor 264 which respectively locate the dynamic ingredient 261 and static ingredient and recipe 265 of packet 1. As another example, for an outgoing test packet 2, the generator ring buffer 230 includes a dynamic ingredient descriptor 268 and a static ingredient and recipe descriptor 262 which respectively locate the dynamic ingredient 269 and static ingredient and recipe 263 of packet 2. Contiguous memory reads are faster. In this embodiment, the static ingredient and recipe are together to reduce the number of reads from two to one, which is another improvement over prior releases of TestCenter, which had separated the static ingredient and recipe, requiring two reads instead of one read.

The relative rate at which the packets are transmitted are controlled by the number of times each packet appears in the Frame Sequence Table. For example, if a pointer to Packet 1 appears twice as often as a pointer to Packet 0, then Packet 1 has twice the rate on the link as does Packet 0. The Frame Sequence Table also includes a field for specifying the inter-frame gap to be inserted after the packet is transmitted. This means that the inter-frame gap may be different for each time the packet is in the table, allowing accurate control over the rate of transmissions of the packets.

Accordingly, the memory intensive operations of generating the test packet ingredient descriptors and the test packet ingredients are performed by the microprocessor 600.

The FPGA 300 generates the outgoing test packets from the test packet ingredients which are transferred by DMA from the memory 200 of the microprocessor 600. The incoming test packets are parsed by the FPGA 300, and transferred by DMA into the memory 200 of the microprocessor 600 along with a short pre-pad structure that contains the result of the parsing, shown in FIG. 14.

The FPGA 300 includes block RAM memory. Sufficient block RAM memory is used for FIFOs for processing the stream of outgoing test packets and for processing the stream of incoming test packets. Alternatively, memory external to and directly connected to the FPGA 300 may be used for such processing, although such use of external memory runs counter to the advantages of the technology described herein.

The processing in the microprocessor 600 is optimized in a number of ways to allow the desired speed to be achieved: Data structures are optimized to minimize the amount they must be touched by the generator and analyzer thread(s). Code is optimized to minimize the number of branches required during the processing. Advantage is taken (at least in the generator) of the SSE2 instructions of the microprocessor 600 that allow operations on 4 32-bit Dwords simultaneously. This allows 4 VFDs to be processed simultaneously, or 8 VFDs with a bit more effort.

Figure 6:
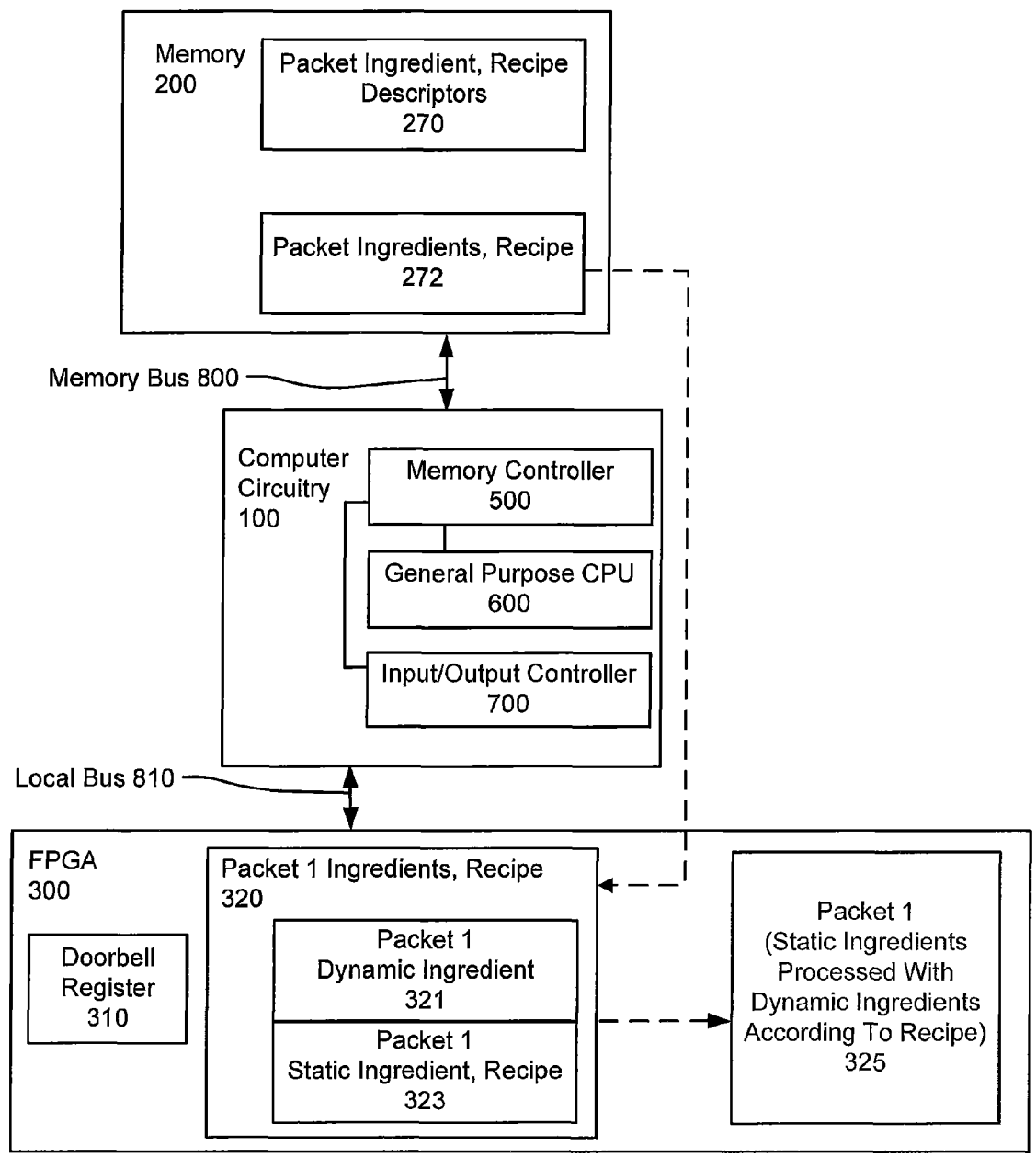
FIG. 6 is an example block diagram of part of a test module such as in FIG. 3, showing the FPGA performing assembly of a packet from the packet ingredients in the memory accessed by the memory bus.

FIG. 6 is an example block diagram of part of a test module such as in FIG. 3, showing the FPGA performing assembly of a packet from the packet ingredients in the memory accessed by the memory bus. The FPGA 300 includes a doorbell register 310. Shown is the assembly by the FPGA 300 of packet 1 incorporating dynamic ingredient 321 and static ingredient and recipe 323 of packet 1 received via local bus 810 from memory 200. The FPGA processes the static ingredients with the dynamic ingredients according to the recipe to generate packet 1 325.

The following describes the doorbell register 310. The microprocessor 600 writes to give the packet ingredient and recipe descriptors 270 to the FPGA 300. The microprocessor 600 reads to determine how many descriptors there are room for, with the generator, or how many have been processed, with the analyzer. Read operation is slow in an embodiment where the microprocessor 600 stalls until results are available, degrading performance. In another embodiment, the FPGA will periodically post this information to the cache of the microprocessor 600, so the read does not stall the microprocessor 600.

The dynamic ingredients 321 and the static ingredients 323 are transferred by direct memory access (DMA) from the memory 200 accessed by the memory controller 500 and the microprocessor 600. This DMA access reduces the load on the microprocessor 600 and associated latency. The memory 200 stores the packet ingredients and recipe 272 and the packet ingredient and recipe descriptors, which were both generated by the microprocessor 600.

The generation of each packet is controlled by two local bus reads from memory 200. The first read is a modifier fragment included in the dynamic ingredient, which contains information that is dynamic for each packet. The modifier fragment is individually calculated by the microprocessor for each outgoing packet. The second read is a combo fragment, which contains two sets of static information, the base content and the control fragment, generally neither touched nor modified by the processor for each outgoing packet.

The control fragment contains all of the various flags and offsets required to generate the packet, including where to insert the contents of the modifier fragment.

The base content contains the first portion of the packet, up to the first byte of fill. The base content is modified according to the modifier fragment. The base content is placed immediately after the control fragment in memory 200, so both are read using a single descriptor.

To meet the exacting timing requirements of test equipment, the dispatch times of packets are precisely controlled and measured. The dispatch time of the first frame is controlled by comparing the running timestamp clock to a specified time in the future. When those are equal, transmission of the first frame begins. This allows specification of the initial frame's dispatch time to within a few ticks of the 100 MHz timestamp clock. Remaining frames are then dispatched based on the inter-frame gap specified for each frame.

The inter-frame gap, which controls the dispatch time of subsequent frames, is part of the modifier fragment. This field specifies the number of bytes of idle that are to be inserted after the current frame. When that number of idle bytes has been transmitted, the first byte of the succeeding frame is then transmitted.

As each frame is prepared for transmission, the FPGA measures the time at which either the first byte or the last byte of the frame is transmitted, and inserts that time into the outgoing frame. Although the FPGA measures this time before the frame is actually transmitted, a fixed amount of time elapses between the point at which the timestamp is measured, and the point at which the frame actually is inserted onto the link, and the timestamp scheme compensates for this fixed amount of time, either in the timestamp itself or in processing subsequent to receipt of the frame.

Figure 7:
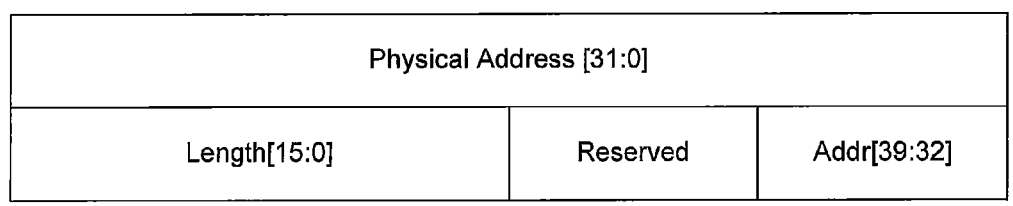
FIG. 7 is an example data structure format of a packet ingredient descriptor, such as in FIGS. 5 and 6.

FIG. 7 is an example data structure format of a packet ingredient descriptor, such as in FIGS. 5 and 6.

This descriptor provides the information needed by the FPGA to access an ingredient in the memory using the memory bus. The descriptor contains a physical address within the memory at which the ingredient is stored. It also contains the length of the ingredient in bytes. This is sufficient information to allow the memory bus to retrieve the ingredient in question. In this implementation, the descriptor is 8 bytes in length; other implementations can adjust the length of the descriptor such that the descriptor has sufficient data to specify a physical address within the memory at which the ingredient is stored.

The ring buffer controls are implemented in PCI-E BAR register space. The descriptors are read-only by the FPGA. Read is snooped from cache. Within the actual descriptor, address bits [39:0] are the physical address of the start of ring buffer. The length is the total number of descriptor positions in the ring buffer, a power of 2.

Figure 8:
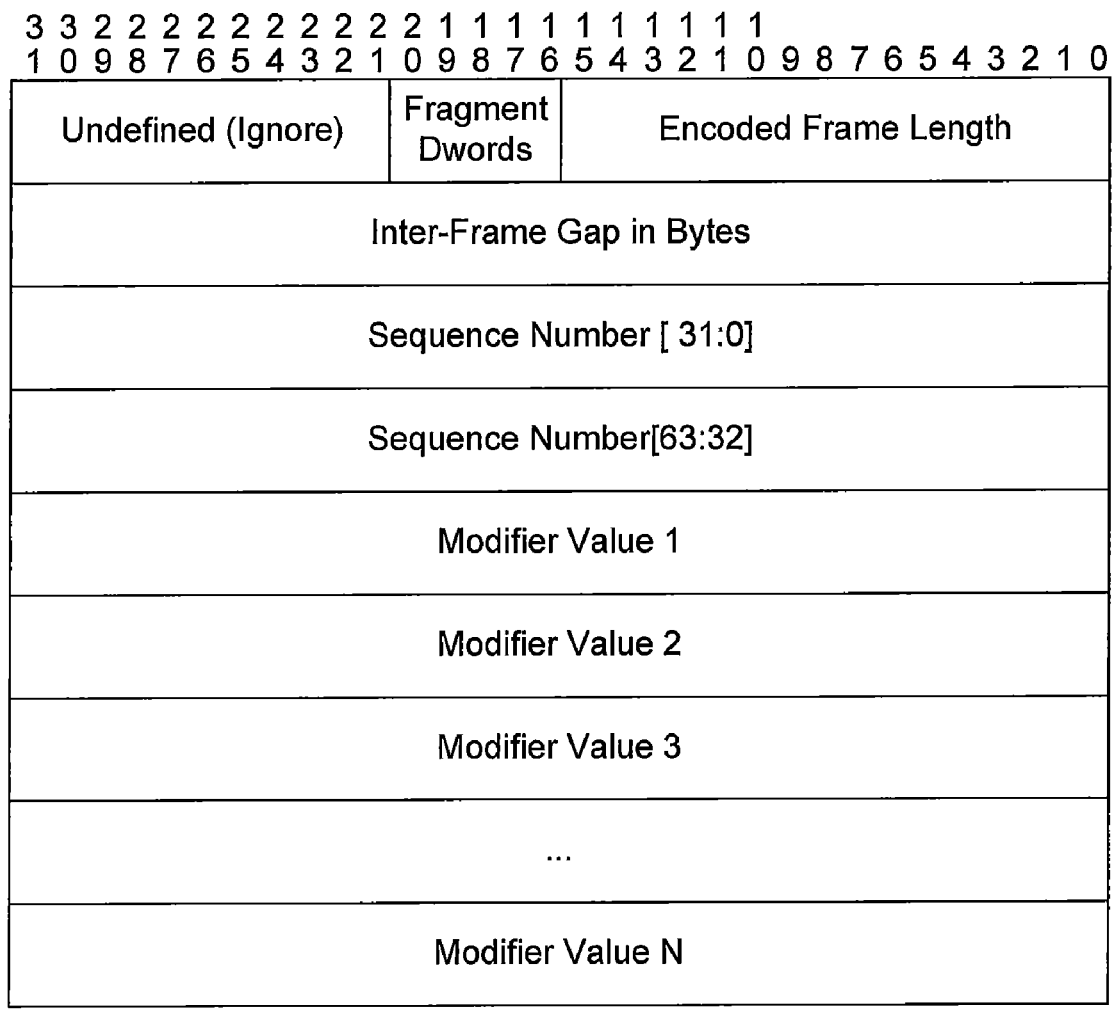
FIG. 8 is an example data structure format of a modifier fragment of a dynamic ingredient of a packet, such as in FIGS. 5 and 6.

FIG. 8 is an example data structure format of a modifier fragment of a dynamic ingredient of a packet, such as in FIGS. 5 and 6.

The dynamic modifier fragment contains information that changes each time a specific frame is transmitted. The processor must generate each modifier fragment based on information stored in the modifier parameter area of its memory for this frame. In this implementation, the modifier fragment contains the following:

a) The length of the modifier fragment in 32-bit Dwords. This permits the FPGA to know when it has completed reading the fragment, which is of variable length.

b) An encoded length in bytes of the frame to be transmitted. In some cases this may be fixed. In other cases, the length is computed by the FPGA as an incrementing or decrementing length, or even as a uniformly distributed random length.

c) The inter-frame gap to be inserted on the outgoing link after the completion of this current frame. This value may be constant or it may be a variable value allowing adjustment of the rates at which the various frames are transmitted.

d) A sequence number computed for this specific frame. The sequence number is used by the receiving test equipment to verify whether any received frames have been dropped or delivered out of sequence.

e) From 0 to N 32-bit modifier values calculated by the processor, to be inserted into the outgoing frame. These modifier values are placed into the frame at offsets from the start of frame that are indicated in the Control Fragment described later. As an example of the use of such modifiers, one might be positioned to replace the Destination IP Address in the IP Header which is part of the Frame. This allows a single Frame recipe to effectively generate large numbers of IP flows. In addition, there are from 0 to N 32-bit values that can be read from a table in memory to overlay additional locations in the outgoing frame. These values are precomputed by the CPU to be readily inserted into the packet by the FPGA, without requiring additional computation by the FPGA. Accordingly, the modifier fragment of this embodiment is processed quickly and easily than unlike prior releases of TestCenter, which required by the FPGA to calculate the actual modifier values inserted by the FPGA based on the entries from the modifier parameters table.

By splitting the packet ingredients into dynamic and static parts, only the dynamic part is required to be generated for varying packets of a particular packet stream.

Modifications are also made to the frame to handle IPV4 checksums, adjusting the length fields in the various headers to account for non fixed-length frames, and computing and inserting TCP or UDP checksums if required. Because this is a test instrument, provision is made to allow the various checksums to be inserted with errors if desired.

Once all the fill pattern has been inserted, and all modification are made to the frame, a Spirent signature field is inserted, containing stream identification, sequence number, very accurate timestamp, and other fields required to make detection of the signature field robust, and also to allow the TCP/UDP checksum to be correct without having to read the entire packet first.

FIG. 9 is an example data structure format of a control fragment of a recipe of a packet, such as in FIGS. 5 and 6.

The control fragment defines the various items that the FPGA requires in order to build each outgoing frame. In this implementation, the control fragment contains the following information:

a) A fill type, to indicate one of several patterns that the FPGA will use to fill the contents of the frame after the base content has been exhausted, and up to the beginning of the signature field. For example, the remaining bytes may be filled with a constant byte, or with an incrementing or decrementing byte, or with a pseudo-random bit pattern.

b) A fill byte; in case of a constant byte fill pattern, this is the byte to be inserted. In case of an incrementing or decrementing pattern, this is the initial byte inserted. In case of a pseudo-random bit pattern, this parameter is ignored.

c) The length of the control fragment in 32-bit dwords. This is used by the FPGA logic to determine when it has read the complete control fragment. Data immediately following the control fragment is (in this implementation) the base content of the frame.

d) The length of the base content in bytes. The FPGA logic uses this to determine the amount of additional information read after the control fragment. This base content contains such fields as MAC headers, IP Headers, etc. In other words, the first portion of the outgoing Frame. The transmitted frame contains this base content first, followed by the fill pattern, followed by a signature field that contains sequence and timestamp information.

e) Ethernet Length data is used for some frame protocols to set the Ethernet Length in the outgoing Frame. This field is used along with the Frame Length information from the Modifier fragment to determine the actual length to be inserted.

f) Ethernet Length offset is used to indicate the offset from the start of frame at which the Ethernet Length is to be inserted.

g) Stream Index—this is a unique flow identifier for this specific frame, and is inserted into the signature field so that the receiving test equipment can correlate statistics for this specific flow.

h) The signature offset indicates the number of bytes prior to the end of frame at which the signature is to be inserted.

i) The TCP/UDP Header offset indicates the offset from the start of frame at which a TCP header is present in the frame. The FPGA logic requires this in order to be able to compute a TCP or UDP checksum.

j) IP Header offset. The FPGA requires this information to allow it to adjust the length information in the header. In addition, if the frame is IPV4, this offset indicates where to begin computing the IPV4 Header checksum.

k) Inner IP Header Offset. For some protocols, an IP frame is "tunneled" inside of an outer IP Frame. In this case, the Inner offset allows the FPGA logic to adjust the length and the IP Header checksum for the second header.

l) Inner FCS Offset and Inner FCS End. If multiple encapsulations are present, for some protocols in which complete frames are encapsulated within a larger frame, there is an inner FCS that must be computed to make the frame valid. The Offset indicates the offset from the start of frame at which the inner FCS is to be computed. The Inner FCS End indicates the offset from the end of frame at which that inner FCS is to be inserted.

m) Various one-bit flags, used by the FPGA logic to indicate specific functions. In this implementation, the following flags are included: UDP or TCP to indicate the presence of either protocol in the outgoing frame. IPV4 to indicate that the outer IP header is IPV4 (or IPV6). IPError to indicate that the IPV4 header checksum should be errored. FCS to indicate that the FCS inserted at the end of the frame should be errored. MPLS and VLAN to indicate whether those protocols are present in the frame. Inner IPV4 to indicate the flavor of an inner IP header if present. ECK to indicate that the TCP or UDP checksum in the outgoing frame should be errored. PSH to indicate that a TCP or UDP checksum should be applied at the inner (or outer) IP Header. IFC to indicate that the inner FCS should be computed, and IFE to indicate that the inner FCS should be errored.

n) 0 to N offsets used to indicate where the corresponding Modfiers in the Modifier Fragment should be inserted in the outgoing frame. In earlier versions of TestCenter, these offsets originated from the modifier parameters table, rather than from the frame control structures table. By moving these offsets to the frame control structures table, processing speed is greatly increased.

o) 8 Mask fields, used to indicate the number of bits to be masked off in the first 8 modifiers. This allows these modifiers to be placed at locations that are not multiples of 8 bits offset from the start of frame.

The control fragment's packet ingredients are interpreted by the FPGA to fill out the test packet. In this way, a balance is met between reducing the overhead on the microprocessor so that the microprocessor is not required to generate the complete test packet as with a network interface card, yet sufficient packet ingredients are transferred to the FPGA to eliminate or significantly reduce the amount of fast memory required to be directly connected to the FPGA.

Some of the example fields are as follows:

The length of the outgoing packet. This may be fixed, incrementing or decrementing within limits, or random.

Another static ingredient of a packet is the base content, which specifies the first N bytes of the packet to be transmitted, where N is specified by a field in the Frame Control Structure, such up to 1024 bytes. After the base content has been copied into the packet, the fill pattern is inserted out to the last byte prior to the Spirent signature field.

Figure 10:
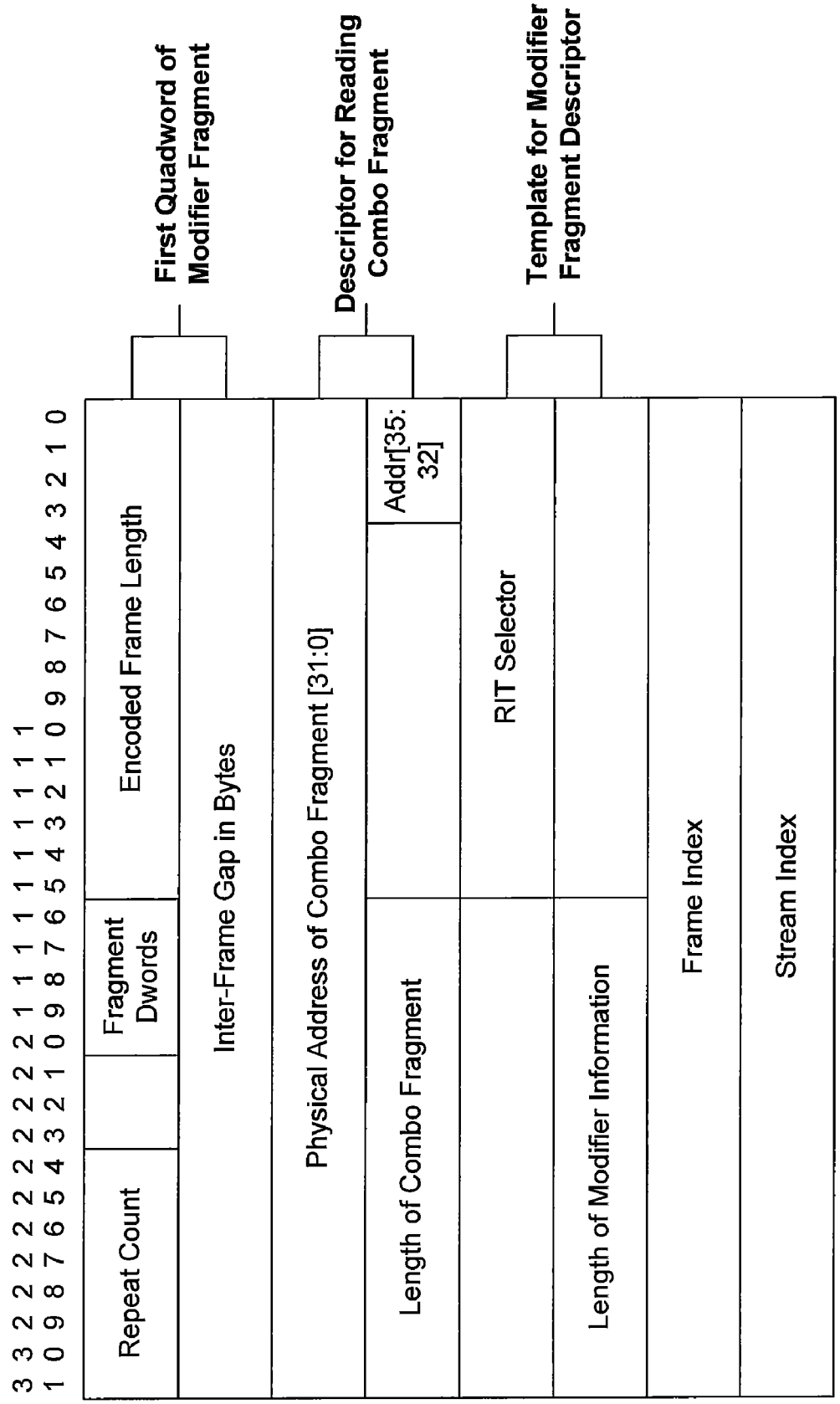
FIG. 10 is an example data structure format of a frame sequence table, such as in FIG. 4.

FIG. 10 is an example data structure format of a frame sequence table, such as in FIG. 4.

The frame sequence table is accessed by the processor to determine the next frame to be generated. In this implementation, each entry in the frame sequence table is 32 bytes. The fields within are used as follows:

a) The first 8 bytes are identical to the first 8 bytes of the Modifier fragment, and the processor simply needs to copy that into the modifier fragment it builds for each outgoing frame.

b) The second 8 bytes are the descriptor that the FPGA needs to use to read the combination of the control fragment and the base content. The processor simply copies this value to the ring buffer without modification.

c) The 3rd 8-byte value is a template for generating the descriptor that the FPGA needs to used to read the modifier fragment. The length value is in place, and the processor needs to insert the physical address of the modifier fragment which it builds for each outgoing frame.

d) An RIT selector is used to access modifier information in processor memory that consists of a fixed table. If present, values will be read from this table and inserted into the outgoing Modifier Fragment.

e) Frame Index—this index permits the CPU to locate the combination of control fragment and base content within memory. This is only used at setup time, and is not used while the frames are being transmitted.

f) Stream Index. This index permits the processor to access the Modifier Parameters for this frame, in order to compute the dynamic portions of the Modifier Fragment each time a frame from this stream is generated.

The SSE2 instructions cut down branches.

FIG. 11 is an example Modifier Parameters data structure format used by the CPU to process up to 4 VFD (Variable Fields) using processor instructions that operate on 128-bit quantities.

The structure is 128 bytes in length, with the first 64 bytes being volatile (updated every time a frame is transmitted) and the remaining 64 bytes being read-only when used. The structure is accessed in an array of such structures by using the Stream Index from the frame sequence table. The 128-bit entities in the structure are:

a) VFD Counts—these are 4 counters that are possibly updated each time the structure is accessed. The value of the Modifier to be inserted into the Modifier Fragment each time is the sum of the VFD Counts and the VFD Init value.

b) VFD Incr—These indicate the amount by which each of the VFD Counts is to be incremented (or decremented) each time the VFD Count is updated.

c) VFD Recycle—These field indicate the maximum (or minimum) values that the VFD Counts are allowed to take. When the VFD Counts reach this maximum, they are reset to zero and begin the counting sequence again.

d) VFD Stutter. If these counters are non-zero, the VFD counts are not allowed up update. The stutter counters are incremented until they are equal to the Max Stutter values. Only then are the VFD counts allowed to update.

e) Sequence Number—this is the Sequence Number that is inserted into the Modifier Fragment. It is incremented each time this Stream is accessed.

f) RIT Count. This counter is used to access the fixed table RIT information if needed for this frame. The count is used as an address into the table to determine which entries in the table are transmitted next. The RIT count has a Stutter and Recycle just as the VFDs.

FIG. 12 is an example Modifier Parameters data structure format used by the CPU to process from 5 to 8 VFDs using processor instructions that operate on 128-bit quantities. The structure is 192 bytes in length, with the first 64 bytes being volatile and the remaining 128 bytes being read-only when used. The structure is accessed in an array of such structures by using the Stream Index from the frame sequence table. The same fields are present as was the case in FIG. 11, except that the Sequence Number and RIT information are stored in a separate structure in this case. There are 8 VFD counts instead of 4, 8 Stutter counts instead of 4, etc.

FIG. 13 is an example data structure format used for handling the sequence numbering and JUT addressing when using from 5 to 8 VFDs. The Sequence Number and other fields within the structure are the same as indicated for FIG. 11.

Figure 14:
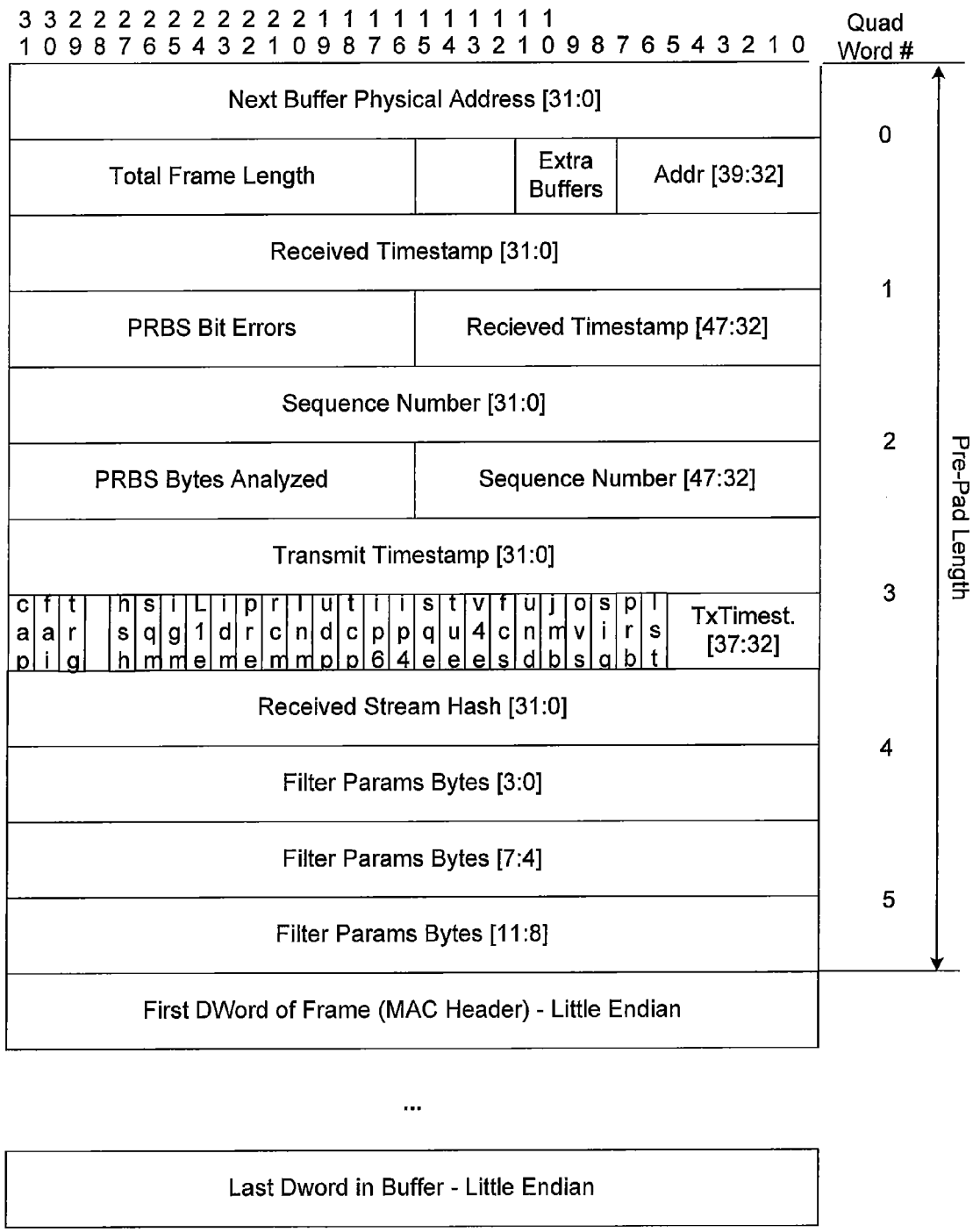
FIG. 14 is an example data structure format of an analyzer prepad and frame structure for frames, followed by an analyzer such as in FIG. 4.

FIG. 14 is an example data structure format of an analyzer prepad and frame structure for frames, followed by an analyzer such as in FIG. 4.

In this implementation, the prepad information is 48 bytes in length. The contents are:

a) Next Buffer Physical Address. In the event that one buffer is not sufficiently long to hold an entire frame, this field will be written with the physical address of the buffer containing the next portion of the Frame.

b) Extra Buffers—If this field is non-zero, it indicates the total number of additional buffers used to hold the entire frame.

c) Total Frame Length—this gives the length of the entire frame written to memory, not including the prepad information.

d) Received Timestamp—this gives the time at which the frame was received on the link.

e) Transmit Timestamp—this value is extracted from the signature field of the incoming frame, and gives the time at which the frame left the generating device.

f) Sequence Number—this value is extracted from the signature field of the incoming frame, and gives the sequence number with which this frame was generated.

g) PRBS Bytes Analyzed and PRBS Bit Errors—If the incoming frame contained a PRBS sequence, these fields indicate the total number of bytes of the PRBS sequence, along with the number of bit errors (if any) detected in the sequence.

h) Filter Parameters—These 12 bytes are extracted from the incoming frame based on setup information written by the processor to the FPGA logic. As an example, the first 4 bytes may be the Stream ID from the signature field of an incoming frame, and the remaining bytes may be taken from various other fields in the frame such as VLAN tags, MPLS labels, or IP addresses. These provide the information that the processor will use to associate this frame with a specific set of statistics being gathered.

i) Received Stream Hash—This field is set to the results of applying a specific hashing function to the 12 bytes of filter parameters. The processor uses this hashing value to determine which statistics are associated with the frame.

j) A number of one-bit flags are set by the FPGA to indicate various results from parsing the frame. There are flags indicating that the frame contained IPV4 or IPV6 headers, TCP or UDP headers, FCS errors, whether the frame was too large or too small, whether it contained a PRBS sequence, whether it contained a signature field, and other bits that are specific to this example implementation. Following the 48-byte prepad is the first Dword of the MAC header, which begins the actual frame data received.

On the receive side, the FPGA parses the incoming frames. As a test instrument, the FPGA parses and recognizes broad class of encapsulations.

The analyzer also generates information regarding a received stream ID for the packet. The analyzer detects the presence of a PRBS23 fill pattern in the packet. Using the received stream ID, the microprocessor of the test module gathers per-stream statistics, such as latency, jitter, inter-arrival times, sequence errors, etc.

FIGS. 15-19 are additional examples of various embodiments of the technology, illustrating that variations of integration of various components fall within the scope of the technology. Other non-illustrated variations also fall within the scope of the technology, such as components only partly integrated with another component.

Figure 15:
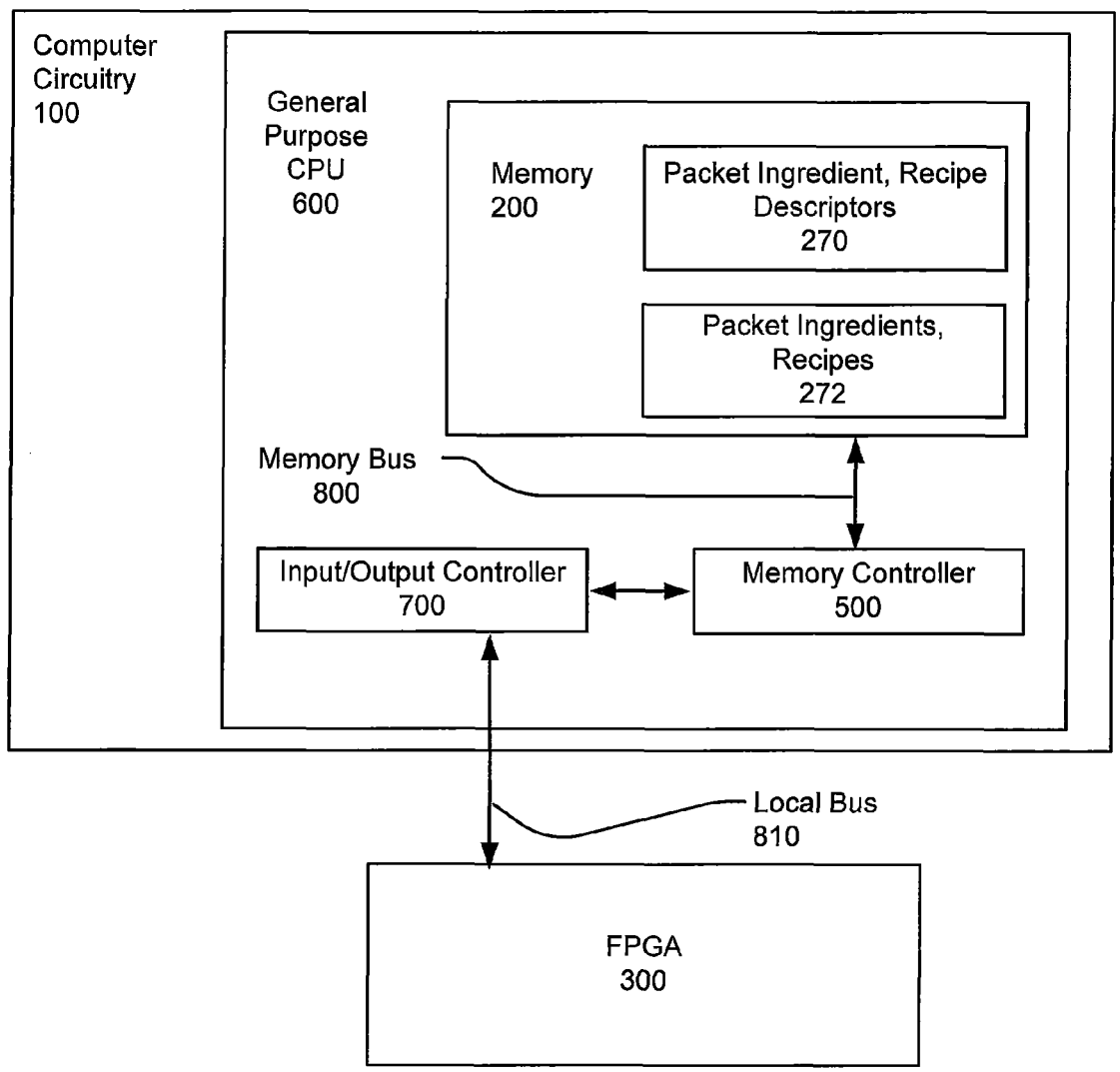
FIG. 15 is an example block diagram of part of a test module such as in FIG. 3, showing an example of computer circuitry which integrates into the CPU, the memory controller, the memory accessed by the memory bus, and input-output controller.

FIG. 15 is an example block diagram of part of a test module such as in FIG. 3, showing an example of computer circuitry which integrates into the CPU, the memory controller, the memory accessed by the memory bus, and input-output controller.

Figure 16:
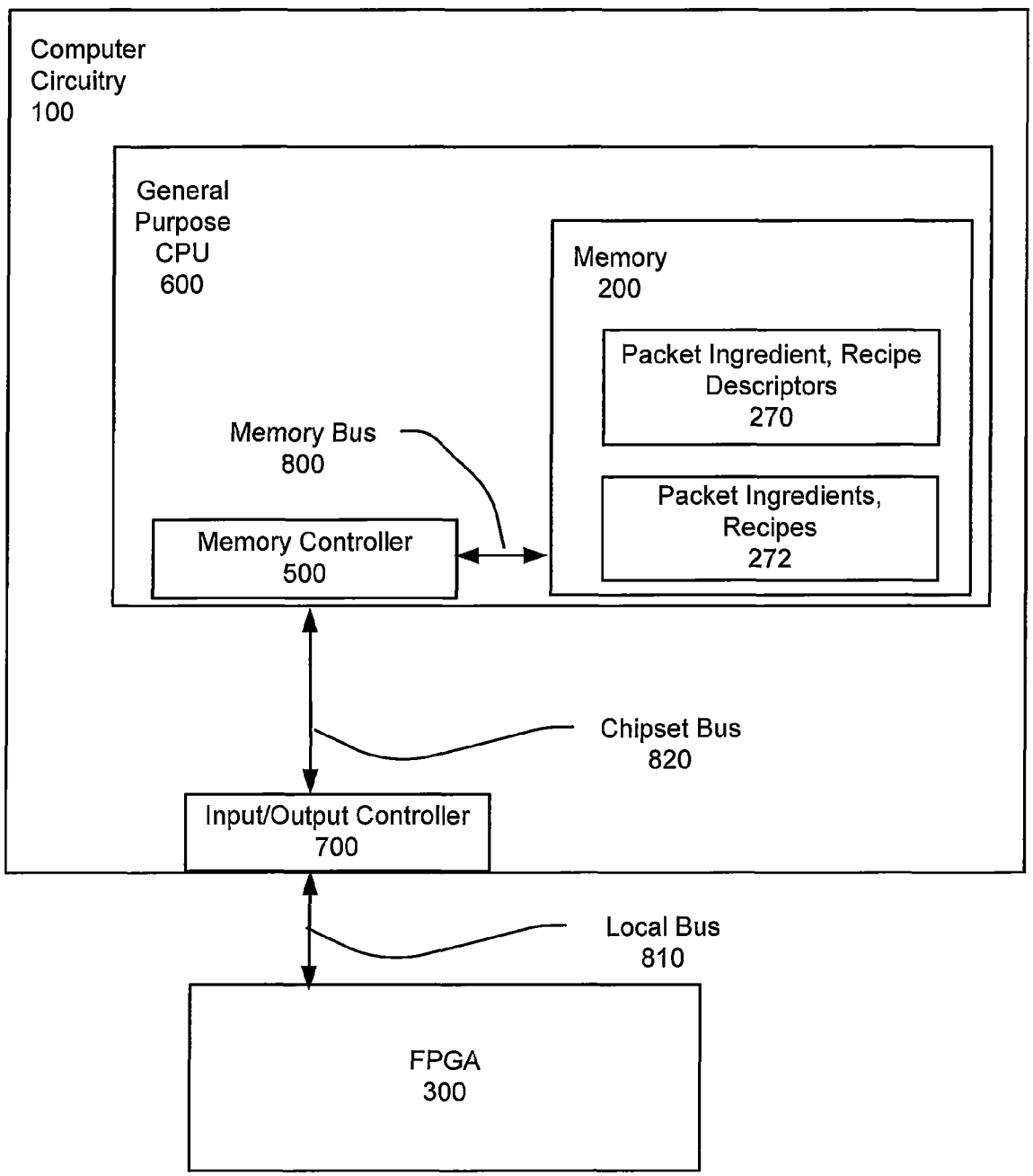
FIG. 16 is another example block diagram of part of a test module such as in FIG. 3, showing an example of computer circuitry which integrates into the CPU, the memory controller, and the memory accessed by the memory bus.

FIG. 16 is another example block diagram of part of a test module such as in FIG. 3, showing an example of computer circuitry which integrates into the CPU, the memory controller, and the memory accessed by the memory bus.

Figure 17:
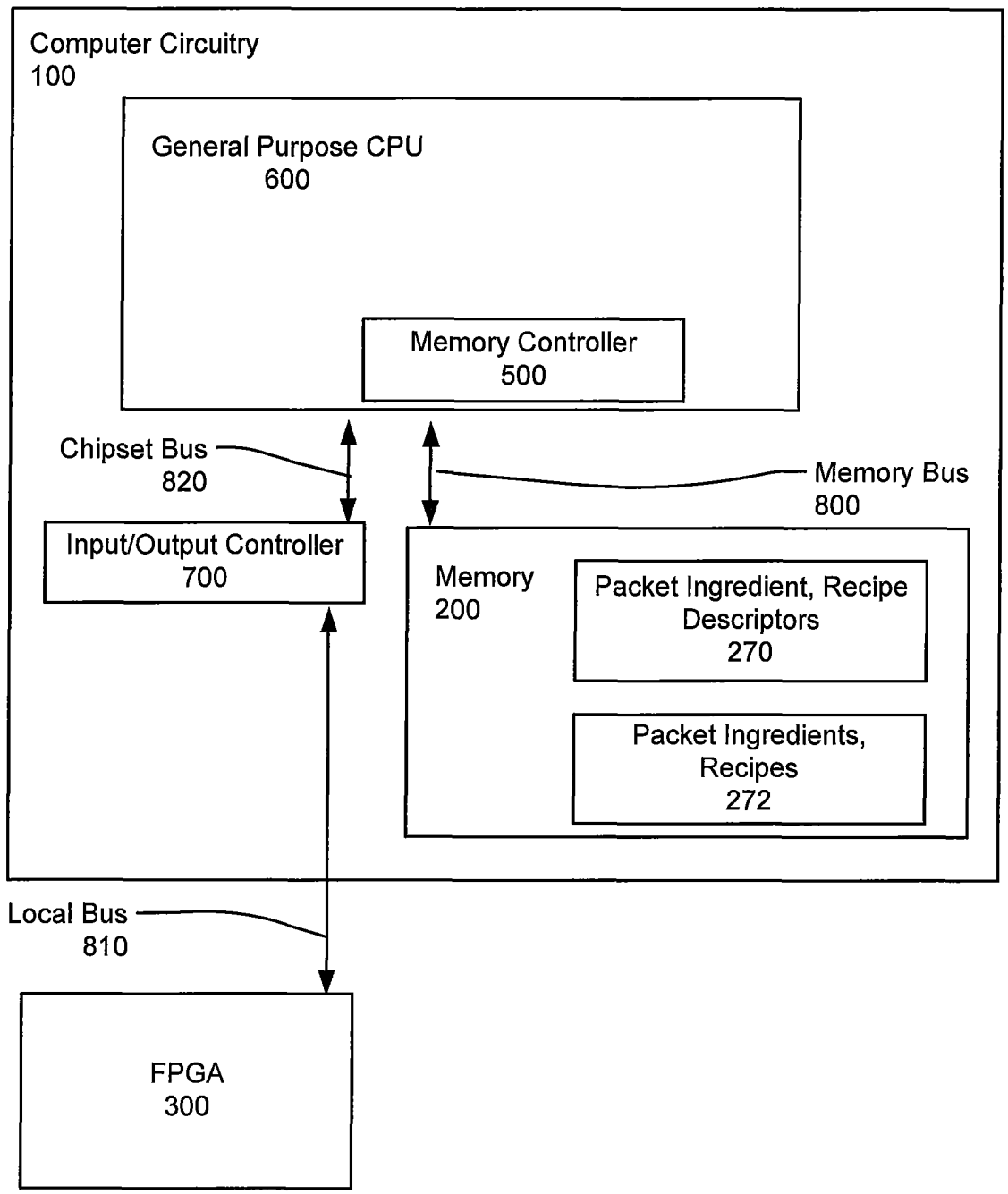
FIG. 17 is an example block diagram of part of a test module such as in FIG. 3, showing an example of computer circuitry which integrates into the CPU, the memory controller.

FIG. 17 is an example block diagram of part of a test module such as in FIG. 3, showing an example of computer circuitry which integrates into the CPU, the memory controller.

Figure 18:
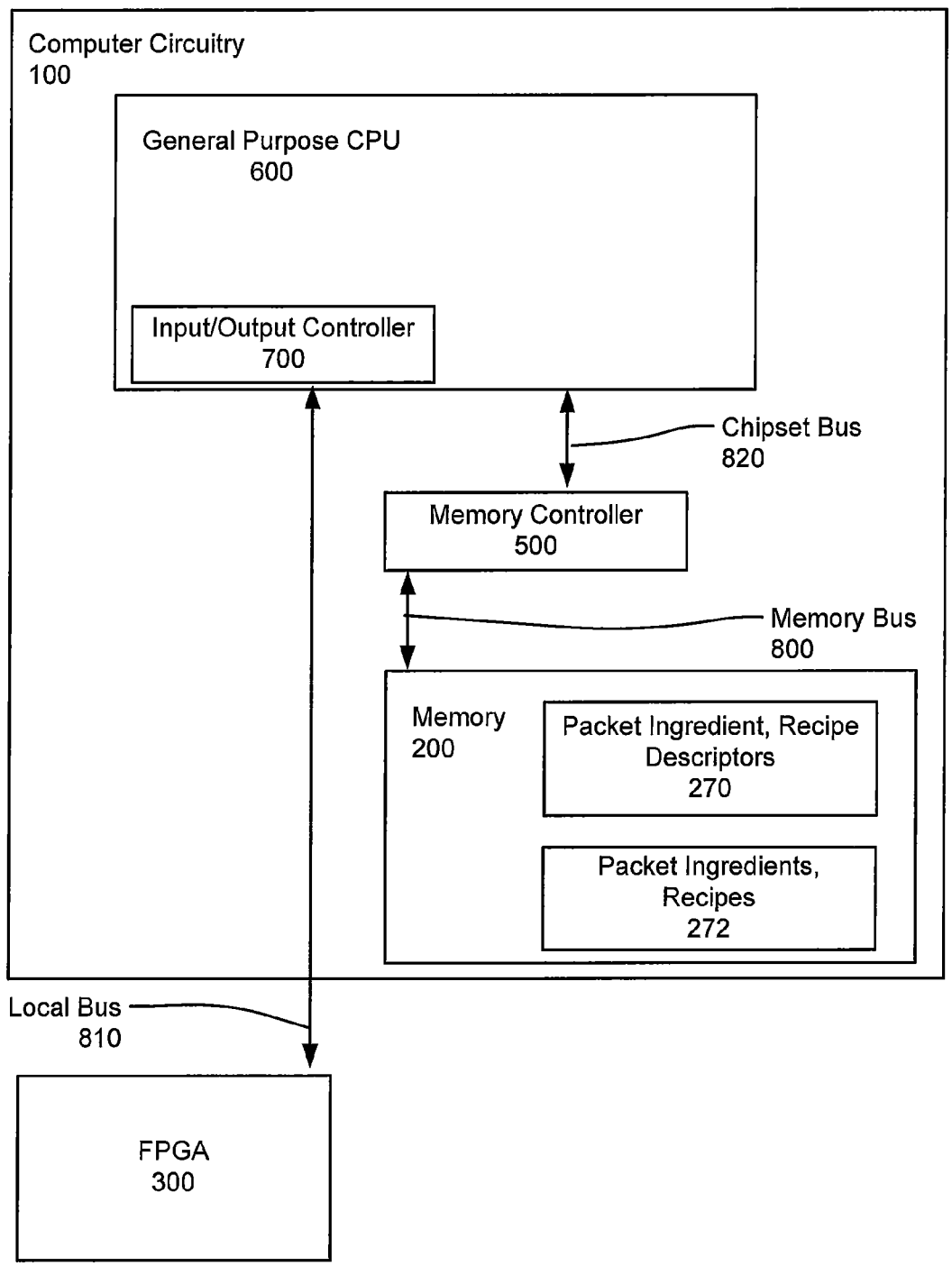
FIG. 18 is an example block diagram of part of a test module such as in FIG. 3, showing an example of computer circuitry which integrates into the CPU, the input-output controller.

FIG. 18 is an example block diagram of part of a test module such as in FIG. 3, showing an example of computer circuitry which integrates into the CPU, the input-output controller.

Figure 19:
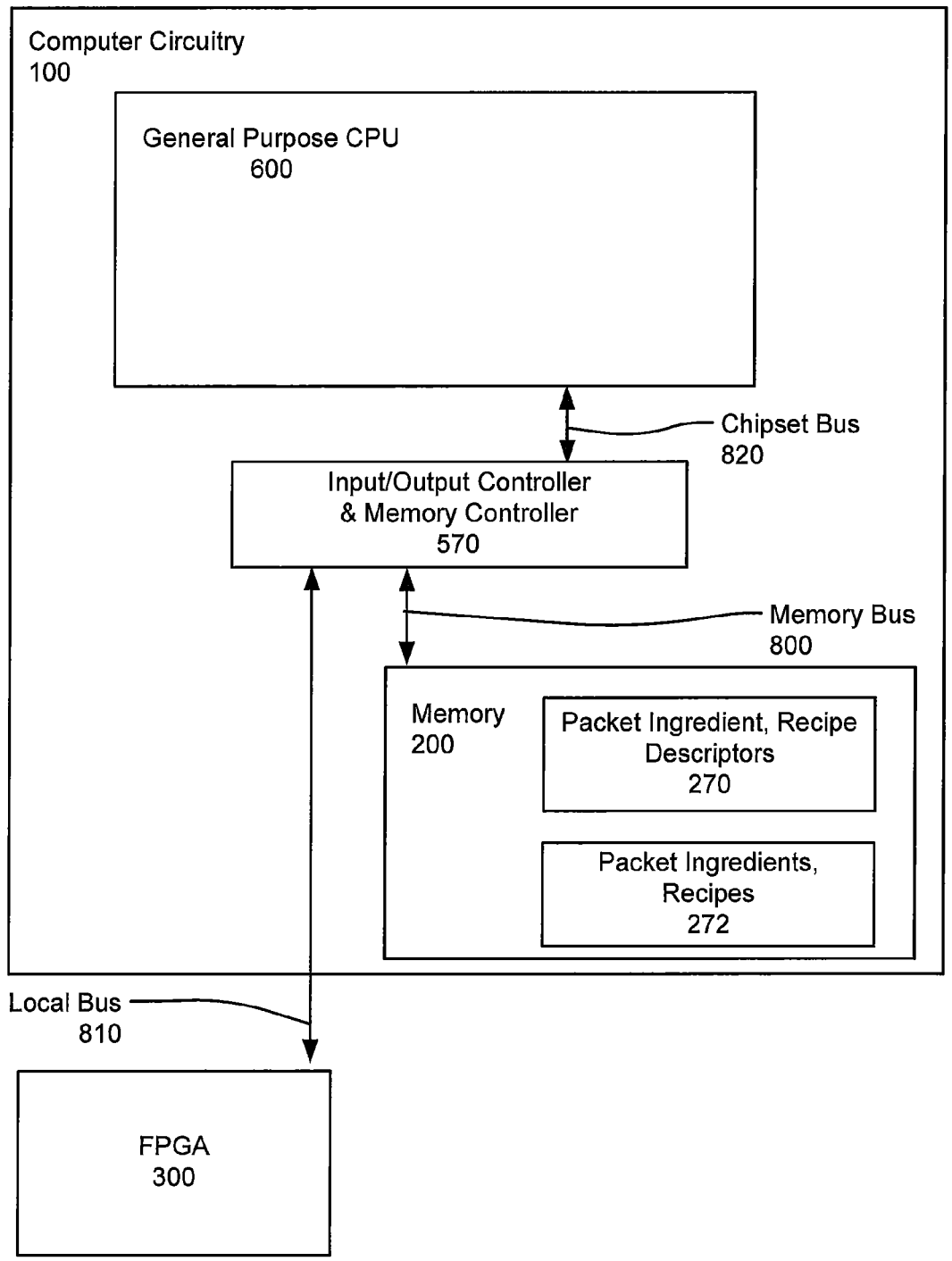
FIG. 19 is an example block diagram of part of a test module such as in FIG. 3, showing an example of computer circuitry which integrates the input-output controller and the memory controller.

FIG. 19 is an example block diagram of part of a test module such as in FIG. 3, showing an example of computer circuitry which integrates the input-output controller and the memory controller.

Figure 20:
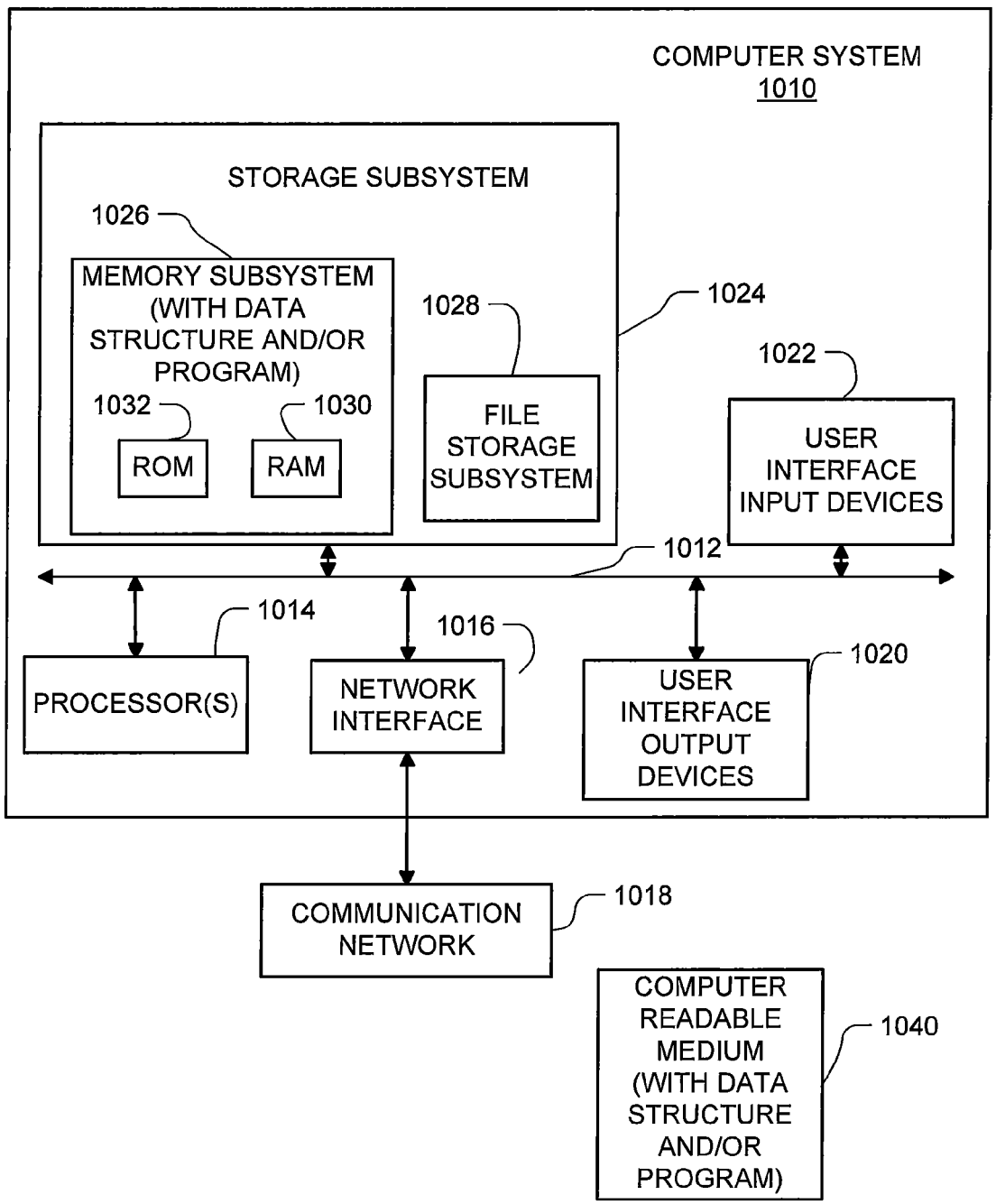
FIG. 20 is an example block diagram of a computer system, such as a computer system with a memory storing a program implementing the described technology or a data structure implementing the described technology.

FIG. 20 is an example block diagram of a computer system, such as a computer system with a memory storing a program implementing the described technology or a data structure implementing the described technology.

Shown is a simplified block diagram of a computer system 1010 suitable for use with embodiments of the technology. Computer system 1010 typically includes at least one processor 1014 which communicates with a number of peripheral devices via bus subsystem 1012. These peripheral devices may include a storage subsystem 1024, comprising a memory subsystem 1026 and a file storage subsystem 1028, user interface input devices 1022, user interface output devices 1020, and a network interface subsystem 1016. The input and output devices allow user interaction with computer system 1010. Network interface subsystem 1016 provides an interface to outside networks, including an interface to communication network 1018, and is coupled via communication network 1018 to corresponding interface devices in other computer systems. Communication network 1018 may comprise many interconnected computer systems and communication links. These communication links may be wireline links, optical links, wireless links, or any other mechanisms for communication of information. While in one embodiment, communication network 1018 is the Internet, in other embodiments, communication network 1018 may be any suitable computer network.

User interface input devices 1022 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 1010 or onto computer network 1018.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1010 to the user or to another machine or computer system.

Storage subsystem 1024 stores the basic programming and data constructs that provide the functionality of certain embodiments of the present invention. For example, the various modules implementing the functionality of certain embodiments of the invention may be stored in storage subsystem 1024. These software modules are generally executed by processor 1014.

Memory subsystem 1026 typically includes a number of memories including a main random access memory (RAM) 1030 for storage of instructions and data during program execution and a read only memory (ROM) 1032 in which fixed instructions are stored. File storage subsystem 1028 provides persistent storage for program and data files, and may include a hard disk drive, a floppy disk drive along with associated removable media, a CD-ROM drive, an optical drive, or removable media cartridges. The databases and modules implementing the functionality of certain embodiments of the invention may be stored by file storage subsystem 1028.

Bus subsystem 1012 provides a mechanism for letting the various components and subsystems of computer system 1010 communicate with each other as intended. Although bus subsystem 1012 is shown schematically as a single bus, alternative embodiments of the bus subsystem may use multiple busses.

Computer readable medium 1040 can be a medium associated with file storage subsystem 1028, and/or with network interface 1016. The computer readable medium can be non-transitory and transitory media, such as a hard disk, a floppy disk, a CD-ROM, an optical medium, removable media cartridge, or electromagnetic wave. The computer readable medium 1040 is shown storing program instructions and/or data structures of the described technology.

Computer system 1010 itself can be of varying types including a personal computer, a portable computer, a workstation, a computer terminal, a network computer, a television, a mainframe, or any other data processing system or user device. Due to the ever-changing nature of computers and networks, the description of computer system 1010 depicted in FIG. 20 is intended only as a specific example for purposes of illustrating the preferred embodiments of the present invention. Many other configurations of computer system 1010 are possible having more or less components than the computer system depicted in FIG. 20.

This microprocessor is part of computer circuitry which includes a memory controller and an input-output controller. The microprocessor relies on the programmable logic device, because the outgoing test packets—which incorporate the test packet ingredients—are generated by the programmable logic device, rather than the microprocessor. The test packet ingredients generated by the microprocessor are stored at memory of the microprocessor, where the memory is coupled by a memory bus to this computer circuitry. The programmable logic device is coupled by a local bus to this computer circuitry.

A bus is a set of one or more lines used by an interface system to transfer data between devices. A local bus of a microprocessor supports addressing of the memory of the microprocessor, at memory addresses specified by a device attached to the local bus, such as a programmable logic device. A local bus supports reads and writes of memory addresses of such memory, and supports peer-to-peer communication between devices connected to the local bus. The memory bus, unlike a local bus, connects the memory to the computer circuitry, and communicates memory addresses and memory data, rather than supporting peer-to-peer communication of devices connected to the memory bus. The memory bus is specialized for the fast communication required by memory access with the CPU.

Examples of such buses above are PCI; PCI Express; HyperTransport; and InfiniBand.

A common example of a programmable logic device having integrated circuitry with configurably interconnected programmable logic is an FPGA, or field-programmable gate array. Such a programmable logic device does not generally include microprocessors, because microprocessors, although programmable, generally lack configurable interconnects among the internal logic components.

The controller circuits include a memory controller of the microprocessor, and an input/output controller of the microprocessor. The memory controller manages the flow of memory addresses and memory data over the memory bus with the memory of the microprocessor. The input/output controller connects and controls peripheral devices, particularly peripheral devices such as a programmable logic device connected to the local bus of the input/output controller.

The memory controller and the input/output controller are "of the microprocessor" if the memory controller and the input/output controller manage the flow of data with the microprocessor, respectively with the memory over the memory bus and with peripheral devices such as a programmable logic device over the local bus. The memory controller and the input/output controller can perform these functions, regardless of whether the memory controller and the input/output controller are integrated circuits physically separated from the microprocessor or are integrated in the same chip as the microprocessor. The memory is memory "of the microprocessor" if the memory serves the microprocessor via a memory controller of the microprocessor, regardless of whether the memory is physically separated from the microprocessor or is integrated in the same chip as the microprocessor.

A "packet" is a formatted unit of information, designed to be transmitted and received as a single unit, of which a frame is an example.

The following discussion details several distinct aspects of the technology. First, aspects are discussed which are directed to the apparatus and method of generating both the test packet ingredients and the test packets incorporating the test packet ingredients. Next, aspects are discussed which are directed to the apparatus and method of generating the test packets incorporating the test packet ingredients, along with computer media with program instructions directed to this. Next, aspects are discussed which are directed to the apparatus and method of generating the test packet ingredients, along with computer media with program instructions directed to this.

One aspect of the technology is an apparatus that divides roles in generating test packets for high packet volume tests between a general purpose processor and a configurable logic device. A microprocessor has a first memory. A programmable logic device has a second memory, which is not large enough to hold all data required to conduct a particular test. The programmable logic device is coupled to the first memory by at least a local bus. A physical port is coupled to the test packets being dispatched from the physical port.

A first module running on the microprocessor performs the following:

generates a list of test packet recipes and test packet ingredients, and stores the list in the first memory for the particular test; and generates the test packet recipes and the test packet ingredients, and stores the test packet ingredients and the test packet recipes in the first memory;

a second module implemented with configurable interconnections on the programmable logic device that:

retrieves the list via at least the local bus into the second memory;

retrieves the test packet ingredients and the test packet recipes according to the list, via at least the local bus into the second memory, in segments such that the second memory is not overflowed;

generates test packets that combine the test packet ingredients according to the test packet recipes, and adding timestamps; and dispatches the test packets via the physical port according to the timestamps.

Another aspect of the technology is an apparatus that divides roles in generating test packets for high packet volume tests between a general purpose processor and a configurable logic device. A microprocessor has a first memory. A programmable logic device has a second memory. The programmable logic device is coupled to the first memory by at least a local bus. A physical port is coupled to the test packets being dispatched from the physical port.

A first module running on the microprocessor performs the following:

generates a list of test packet recipes and test packet ingredients, and stores the list in the first memory for the particular test; and generates the test packet recipes and the test packet ingredients including a modifier ingredient customizing the test packets, such that subsequent generation and customization of test packets requires inclusion but not generation of the modifier ingredient, and stores the test packet ingredients and the test packet recipes in the first memory;

A second module implemented with configurable interconnections on the programmable logic device that performs the following:

retrieves the list via at least the local bus into the second memory;

retrieves the test packet ingredients and the test packet recipes according to the list, via at least the local bus into the second memory;

generates test packets that combine the test packet ingredients according to the test packet recipes and customizes test packets with the modifier ingredient, and adding timestamps; and dispatches the test packets via the physical port according to the timestamps.

In various embodiments, the local bus supports access of the memory at memory addresses specified by the programmable logic device. Examples of such as local bus are a a Peripheral Component Interconnect Express (PCIe) bus and a HyperTransport link.

In some embodiments, the second module retrieves the test packet ingredients and the test packet recipes, via addresses in the first memory included in the list. In some embodiments, the test packet ingredients include a fill pattern indicator, and the programmable logic device is configured to add a fill pattern identified by the fill pattern indicator to the outgoing test packets. In some embodiments, the test packet recipes include control data that specify positions in the test packets at which the programmable logic device adds the modifier ingredient of the test packet ingredients. In some embodiments, the modifier ingredient of the test packet ingredients include replacement data precomputed by the microprocessor such that the replacement data is not computed by the programmable logic device.

In some embodiments, the test packets emulate network traffic from an emulated network.

In some embodiments, the programmable logic device is configured to operate with memory integrated with the programmable logic device.

Various other embodiments are described herein such as technology described with respect to other aspects.

Another aspect of the technology is a method communicating test packets with a network that divides roles in generating test packets for high packet volume tests between a general purpose processor and a configurable logic device, comprising:

generating, with a microprocessor, a list of test packet recipes and test packet ingredients, and storing the list in a first memory of the microprocessor for a particular test;

generating, with the microprocessor, the test packet ingredients and the test packet recipes, and storing the test packet ingredients and the test packet recipes in the first memory;

retrieving with a programmable logic device having configurable interconnections and via at least a local bus, the list into a second memory of the programmable logic device, wherein the second memory is not large enough to hold all data required to conduct the particular test;

retrieving with the programmable logic device and via at least the local bus into the second memory, the test packet ingredients and the test packet recipes according to the list, in segments such that the second memory is not overflowed;

generating with the programmable logic device, test packets that combine the test packet ingredients according to the test packet recipes, and adds timestamps; and dispatching from the programmable logic device, the test packets via a physical port according to the timestamps.

Various embodiments are described herein such as technology described with respect to other aspects.

Another aspect of the technology is a method communicating test packets with a network that divides roles in generating test packets for high packet volume tests between a general purpose processor and a configurable logic device, comprising:

generating, with a microprocessor, a list of test packet recipes and test packet ingredients, and storing the list in a first memory of the microprocessor for a particular test;

generating, with the microprocessor, the test packet recipes and the test packet ingredients including a modifier ingredient customizing the test packets, such that subsequent generation and customization of test packets requires inclusion but not generation of the modifier ingredient, and storing the test packet ingredients and the test packet recipes in the first memory;

retrieving with a programmable logic device having configurable interconnections and via at least the local bus, the list into a second memory of the programmable logic device;

retrieving with the programmable logic device and via at least the local bus into the second memory, the test packet ingredients and the test packet recipes according to the list;

generating with the programmable logic device, test packets that combine the test packet ingredients according to the test packet recipes and customizing test packets with the modifier ingredient, and adding timestamps; and dispatching from the programmable logic device, the test packets via a physical port according to the timestamps.

Another aspect of the technology is an apparatus with a role in generating test packets for high packet volume tests, comprising:

a programmable logic device with a first memory, wherein the first memory is not large enough to hold all data required to conduct a particular test;

a module implemented with configurable interconnections on the programmable logic device that:

retrieves a list of test packet recipes and test packet ingredients for the particular test, via at least a local bus coupled to the programmable logic device, into the first memory;

retrieves the test packet ingredients and the test packet recipes according to the list, via at least the local bus into the first memory, in segments such that the first memory is not overflowed;

generates the test packets that combine the test packet ingredients according to the test packet recipes, and adds timestamps; and dispatches the test packets via a physical port according to the timestamps.

Various embodiments are described herein such as technology described with respect to other aspects.

Another aspect of the technology is a method with a role in generating test packets for high packet volume tests, comprising:

retrieving, with a programmable logic device having configurable interconnections and via at least the local bus into a first memory of the programmable logic device, a list of test packet recipes and test packet ingredients for the particular test, wherein the first memory is not large enough to hold all data required to conduct the particular test;

retrieving with the programmable logic device and via at least the local bus into the first memory, the test packet ingredients and the test packet recipes according to the list, in segments such that the first memory is not overflowed;

generating, with the programmable logic device, test packets that combine the test packet ingredients according to the test packet recipes, and adds timestamps; and dispatching, from the programmable logic device, the test packets via a physical port according to the timestamps.

Various embodiments are described herein such as technology described with respect to other aspects.

Another aspect of the technology is a non-transitory computer readable medium with computer readable instructions for generating test packets for a network, including:

program instructions retrieving, with a programmable logic device having configurable interconnections and via at least the local bus into a first memory of the programmable logic device, a list of test packet recipes and test packet ingredients for the particular test, wherein the first memory is not large enough to hold all data required to conduct the particular test;

program instructions retrieving with the programmable logic device and via at least the local bus into the first memory, the test packet ingredients and the test packet recipes according to the list, in segments such that the first memory is not overflowed;

program instructions generating, with the programmable logic device, test packets that combine the test packet ingredients according to the test packet recipes, and adds timestamps; and program instructions dispatching, from the programmable logic device, the test packets via a physical port according to the timestamps.

Various embodiments are described herein such as technology described with respect to other aspects.

Another aspect of the technology is an apparatus with a role in generating test packets for high packet volume tests. A microprocessor has a first memory. A first module running on the microprocessor performs the following:

generates a list of test packet recipes and test packet ingredients for a particular test; and generates the test packet recipes and the test packet ingredients including a modifier ingredient customizing the test packets, such that subsequent generation and customization of test packets requires inclusion but not generation of the modifier ingredient.

Some embodiments include memory of the microprocessor, where the memory is coupled by a memory bus to the microprocessor, such memory storing the test packet ingredients including the base ingredient and the modifier ingredient.

Some embodiments include the memory of the microprocessor and an input/output controller of the microprocessor. The input/output controller is configured to connect to a local bus supporting access of the memory of the microprocessor at memory addresses specified by the programmable logic device. Examples of such as local bus are a HyperTransport link and a Peripheral Component Interconnect Express bus.

In some embodiments, the microprocessor is configured to generate a test packet sequence table, the test packet sequence table locating the test packet ingredients in a memory of the microprocessor. In some embodiments, the test packet ingredients include a fill pattern indicator, and the microprocessor is configured to rely on the programmable logic device to add a fill pattern identified by the fill pattern indicator to the outgoing test packets. In some embodiments, the test packet recipes include control data that specify positions in the outgoing test packets at which the programmable logic device uses the modifier ingredient of the test packet ingredients.

In some embodiments, test packets emulate network traffic from an emulated network.

Various other embodiments are described herein such as technology described with respect to other aspects.

Another aspect of the technology is a method with a role in generating test packets for high packet volume tests, comprising:

generating, at a microprocessor, a list of test packet recipes and test packet ingredients for a particular test; and generating, at the microprocessor, the test packet recipes and the test packet ingredients including a modifier ingredient customizing the test packets, such that subsequent generation and customization of test packets requires inclusion but not generation of the modifier ingredient.

Various embodiments are described herein such as technology described with respect to other aspects, such as storing the test packet ingredients at memory of the microprocessor, where the memory is coupled by a memory bus to the microprocessor and supporting access of the memory at memory addresses specified by the programmable logic device.

Another aspect of the technology is a non-transitory computer readable medium with computer readable instructions for generating parts of test packets for a network, including:

program instructions generating, at a microprocessor, a list of test packet recipes and test packet ingredients for a particular test; and program instructions generating, at the microprocessor, the test packet recipes and the test packet ingredients including a modifier ingredient customizing the test packets, such that subsequent generation and customization of test packets requires inclusion but not generation of the modifier ingredient.

Various embodiments are described herein such as technology described with respect to other aspects.

Another aspect of the technology is a memory with a role in generating test packets for high packet volume tests.

A data structure is stored in the memory. The data structure comprises a test packet sequence table locating test packet ingredients in the memory. The test packet ingredients include a base ingredient and a modifier ingredient in the memory, such that subsequent generation and customization of test packets requires inclusion but not generation of the modifier ingredient.

Various embodiments are described herein such as technology described with respect to other aspects.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An apparatus with a role in generating test packets for high packet volume tests, comprising:

a programmable logic device with a first memory, wherein the first memory is not large enough to hold all data required to conduct a particular test;

wherein the programmable logic device comprises:

circuitry that retrieves a list of test packet recipes and test packet ingredients for the particular test, via at least a local bus coupled to the programmable logic device, into the first memory;

circuitry that retrieves the test packet ingredients and the test packet recipes according to the list, via at least the local bus into the first memory, in segments such that the first memory is not overflowed;

circuitry that generates the test packets that combine the test packet ingredients according to the test packet recipes, and adds timestamps; and circuitry that dispatches the test packets via a physical port according to the timestamps.

2. The apparatus of claim 1, wherein the local bus supports access of a microprocessor memory at memory addresses specified by the programmable logic device.

3. The apparatus of claim 1, wherein the test packets emulate network traffic from an emulated network.

4. The apparatus of claim 1, wherein the test packet ingredients include a fill pattern indicator, and the programmable logic device is configured to add a fill pattern identified by the fill pattern indicator to the test packets.

5. The apparatus of claim 1, wherein the test packet ingredients include a base ingredient, the base ingredient being common to a plurality of the test packets.

6. The apparatus of claim 1, wherein the modifier ingredient of the test packet ingredients include replacement data precomputed by a microprocessor such that the replacement data is not computed by the programmable logic device.

7. The apparatus of claim 1, wherein the programmable logic device retrieves the test packet ingredients and the test packet recipes, via addresses in the first memory included in the list.

8. The apparatus of claim 1, wherein the test packet recipes include control data that specify positions in the test packets at which the programmable logic device adds the modifier ingredient of the test packet ingredients.

9. The apparatus of claim 1, wherein the programmable logic device is configured to operate with memory integrated with the programmable logic device.

10. The apparatus of claim 1, wherein the local bus is a Peripheral Component Interconnect Express bus.

11. The apparatus of claim 1, wherein the local bus is a HyperTransport link.

12. A method with a role in generating test packets for high packet volume tests, comprising:
   retrieving, with a programmable logic device having configurable interconnections and via at least a local bus into a first memory of the programmable logic device, a list of test packet recipes and test packet ingredients for a particular test, wherein the first memory is not large enough to hold all data required to conduct the particular test;
   retrieving with the programmable logic device and via at least the local bus into the first memory, the test packet ingredients and the test packet recipes according to the list, in segments such that the first memory is not overflowed;
   generating, with the programmable logic device, test packets that combine the test packet ingredients according to the test packet recipes, and adds timestamps; and
   dispatching, from the programmable logic device, the test packets via a physical port according to the timestamps.

13. The method of claim 12, wherein the local bus supports access of a microprocessor memory at memory addresses specified by the programmable logic device.

14. The method of claim 12, wherein the test packets emulate network traffic from an emulated network.

15. The method of claim 12, wherein the test packet ingredients include a fill pattern indicator, and the programmable logic device is configured to add a fill pattern identified by the fill pattern indicator to the test packets.

16. The method of claim 12, wherein the test packet ingredients include a base ingredient, the base ingredient being common to a plurality of the test packets.

17. The method of claim 12, wherein the modifier ingredient of the test packet ingredients include replacement data precomputed by a microprocessor such that the replacement data is not computed by the programmable logic device.

18. The method of claim 12, wherein the programmable logic device retrieves the test packet ingredients and the test packet recipes, via addresses in the first memory included in the list.

19. The method of claim 12, wherein the test packet recipes include control data that specify positions in the test packets at which the programmable logic device adds the modifier ingredient of the test packet ingredients.

20. The method of claim 12, further comprising:
   operating the programmable logic device with memory integrated with the programmable logic device.

21. The method of claim 12, wherein the local bus is a Peripheral Component Interconnect Express bus.

22. The method of claim 12, wherein the local bus is a HyperTransport link.

23. A non-transitory computer readable medium encoded with computer executable instructions with a role in generating test packets for high packet volume tests, comprising:
   computer executable instructions for retrieving, with a programmable logic device having configurable interconnections and via at least a local bus into a first memory of the programmable logic device, a list of test packet recipes and test packet ingredients for a particular test, wherein the first memory is not large enough to hold all data required to conduct the particular test;
   computer executable instructions for retrieving with the programmable logic device and via at least the local bus into the first memory, the test packet ingredients and the test packet recipes according to the list, in segments such that the first memory is not overflowed;
   computer executable instructions for generating, with the programmable logic device, test packets that combine the test packet ingredients according to the test packet recipes, and adds timestamps; and
   computer executable instructions for dispatching, from the programmable logic device, the test packets via a physical port according to the timestamps.

* * * * *